United States Patent
Kummetz et al.

(10) Patent No.: US 10,505,663 B2
(45) Date of Patent: *Dec. 10, 2019

(54) DETECTING PASSIVE RF COMPONENTS USING RADIO FREQUENCY IDENTIFICATION TAGS

(71) Applicant: CommScope Technologies LLC, Hickory, NC (US)

(72) Inventors: Thomas Kummetz, Kissing (DE); Stefan Eisenwinter, Buchdorf (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/001,444

(22) Filed: Jun. 6, 2018

(65) Prior Publication Data

US 2018/0294914 A1 Oct. 11, 2018

Related U.S. Application Data

(63) Continuation of application No. 15/421,600, filed on Feb. 1, 2017, now Pat. No. 10,003,431, which is a
(Continued)

(51) Int. Cl.
*H04K 3/00* (2006.01)
*G06K 7/10* (2006.01)
*H04Q 1/02* (2006.01)

(52) U.S. Cl.
CPC ........... *H04K 3/68* (2013.01); *G06K 7/10019* (2013.01); *G06K 7/10267* (2013.01); *H04Q 1/138* (2013.01)

(58) Field of Classification Search
CPC .... H04K 3/68; G06K 7/0008; G06K 7/10019; G06K 7/10267; G06K 7/10346; G06K 19/07749; H04Q 1/136; H04Q 1/138
See application file for complete search history.

(56) References Cited

U.S. PATENT DOCUMENTS 4,117,466 A * 9/1978 Lichtblau .......... G08B 13/2471
340/501
5,394,503 A * 2/1995 Dietz, Jr. ............. G02B 6/3817
385/134
(Continued)

FOREIGN PATENT DOCUMENTS

CN 101093557 A 12/2007
CN 101473536 A 7/2009
(Continued)

OTHER PUBLICATIONS

European Patent Office, "Communication pursuant to Article 94(3) from EP Application No. 13833662.3 dated Nov. 28, 2018", from Foreign Counterpart to U.S. Appl. No. 13/798,517, Nov. 28, 2018, pp. 1-3, Published: EP.
(Continued)

*Primary Examiner* — Orlando Bousono
(74) *Attorney, Agent, or Firm* — Fogg & Powers LLC

(57) ABSTRACT

Systems and methods are provided for automatically detecting passive components in communications systems using radio frequency identification ("RFID") tags. A coupling circuit is provided in a system between a communications network and an RFID tag. The RFID tag is associated with a passive element of a distributed antenna system ("DAS"). The coupling circuit can allow an RFID signal received from an RFID transmitter over the communications network to be transported to the RFID tag. The coupling circuit can substantially prevent mobile communication signals on the communications network from being transported to the RFID tag.

17 Claims, 19 Drawing Sheets

Related U.S. Application Data continuation of application No. 13/798,517, filed on Mar. 13, 2013, now Pat. No. 9,590,761, which is a continuation-in-part of application No. 13/243,454, filed on Sep. 23, 2011, now abandoned.

(60) Provisional application No. 61/695,362, filed on Aug. 31, 2012.

(56) References Cited

U.S. PATENT DOCUMENTS

| | | | | |
|---|---|---|---|---|
| 5,406,260 | A * | 4/1995 | Cummings | G08B 13/1409 340/568.2 |
| 5,483,467 | A * | 1/1996 | Krupka | G01R 31/023 361/627 |
| 5,550,755 | A * | 8/1996 | Martin | H01R 13/641 340/815.47 |
| 5,764,043 | A * | 6/1998 | Czosnowski | G02B 6/3807 324/149 |
| 5,854,824 | A * | 12/1998 | Bengal | H04M 3/2254 379/32.04 |
| 6,002,331 | A * | 12/1999 | Laor | G02B 6/3807 324/539 |
| 6,222,908 | B1 * | 4/2001 | Bartolutti | H04M 1/24 340/8.1 |
| 6,285,293 | B1 * | 9/2001 | German | H04Q 1/136 340/686.1 |
| 6,330,307 | B1 * | 12/2001 | Bloch | H04Q 1/136 340/8.1 |
| 6,350,148 | B1 * | 2/2002 | Bartolutti | H01R 13/7035 439/188 |
| 6,424,710 | B1 * | 7/2002 | Bartolutti | H04Q 1/136 379/326 |
| 6,522,737 | B1 * | 2/2003 | Bartolutti | H04Q 1/136 340/568.2 |
| 6,703,935 | B1 * | 3/2004 | Chung | G06K 7/10316 340/572.1 |
| 6,725,177 | B2 | 4/2004 | David et al. | |
| 6,784,802 | B1 * | 8/2004 | Stanescu | G01R 31/045 340/572.1 |
| 6,961,675 | B2 | 11/2005 | David | |
| 6,968,994 | B1 * | 11/2005 | Ashwood Smith | G01R 31/023 235/375 |
| 6,980,797 | B1 * | 12/2005 | Tuulos | G06K 7/0008 340/10.42 |
| 6,985,713 | B2 | 1/2006 | Lehr et al. | |
| 7,152,804 | B1 * | 12/2006 | MacKenzie | G06K 19/07749 235/492 |
| 7,153,142 | B2 | 12/2006 | Shifris et al. | |
| 7,160,143 | B2 | 1/2007 | David et al. | |
| 7,170,393 | B2 | 1/2007 | Martin | |
| 7,217,152 | B1 * | 5/2007 | Xin | H04Q 1/02 439/490 |
| 7,297,018 | B2 | 11/2007 | Caveney et al. | |
| 7,370,106 | B2 | 5/2008 | Caveney | |
| 7,468,669 | B1 * | 12/2008 | Beck | H04Q 1/138 235/375 |
| 7,517,243 | B2 | 4/2009 | Caveney et al. | |
| 7,573,254 | B2 | 8/2009 | Cobb et al. | |
| 7,605,707 | B2 | 10/2009 | German et al. | |
| 9,590,761 | B2 | 3/2017 | Kummetz et al. | |
| 10,003,431 | B2 | 6/2018 | Kummetz et al. | |
| 2002/0044096 | A1 * | 4/2002 | Chung | G06K 7/10336 343/742 |
| 2002/0069277 | A1 * | 6/2002 | Caveney | H04L 43/00 709/223 |
| 2003/0006901 | A1 * | 1/2003 | Kim | G06K 7/0008 340/572.5 |
| 2003/0036819 | A1 * | 2/2003 | Lehr | G05F 1/66 700/286 |
| 2003/0204356 | A1 * | 10/2003 | David | G01R 31/041 702/122 |
| 2004/0021452 | A1 * | 2/2004 | Hwang | G01R 31/041 324/66 |
| 2004/0204916 | A1 * | 10/2004 | David | H04L 43/00 702/188 |
| 2004/0219827 | A1 * | 11/2004 | David | G01R 31/041 439/515 |
| 2005/0093700 | A1 * | 5/2005 | Carrender | G06K 19/07749 340/572.8 |
| 2005/0110641 | A1 * | 5/2005 | Mendolia | G01S 5/04 340/572.7 |
| 2005/0219050 | A1 * | 10/2005 | Martin | G01R 31/023 340/572.1 |
| 2005/0237198 | A1 * | 10/2005 | Waldner | G06K 19/0707 340/572.7 |
| 2005/0245127 | A1 * | 11/2005 | Nordin | H04Q 1/14 439/540.1 |
| 2006/0063406 | A1 * | 3/2006 | Shifris | H04L 41/12 439/119 |
| 2006/0094291 | A1 * | 5/2006 | Caveney | H01R 13/641 439/540.1 |
| 2006/0145817 | A1 * | 7/2006 | Aikawa | G06K 7/0008 340/10.3 |
| 2006/0148279 | A1 * | 7/2006 | German | H01R 13/465 439/49 |
| 2006/0159186 | A1 * | 7/2006 | King, Jr. | H04L 5/20 375/258 |
| 2006/0226969 | A1 * | 10/2006 | Bandy | G06K 19/0723 340/505 |
| 2006/0255946 | A1 * | 11/2006 | Khatri | G06K 19/077 340/572.7 |
| 2006/0279409 | A1 * | 12/2006 | Yang | G06K 7/0008 340/10.2 |
| 2007/0001809 | A1 * | 1/2007 | Kodukula | G06K 7/0008 340/10.1 |
| 2007/0060075 | A1 * | 3/2007 | Mikuteit | G06K 7/0008 455/127.2 |
| 2007/0096881 | A1 * | 5/2007 | Pillai | G06K 7/0008 340/10.51 |
| 2007/0117444 | A1 * | 5/2007 | Caveney | H04Q 1/136 439/404 |
| 2007/0125837 | A1 * | 6/2007 | Park | H04M 1/7253 235/375 |
| 2007/0132485 | A1 * | 6/2007 | Alon | H04L 5/20 327/18 |
| 2007/0194929 | A1 * | 8/2007 | Wagner | G06K 7/10346 340/572.7 |
| 2007/0222603 | A1 * | 9/2007 | Lai | G06K 7/0008 340/572.7 |
| 2007/0243725 | A1 * | 10/2007 | Nordin | H04Q 1/136 439/49 |
| 2008/0045075 | A1 * | 2/2008 | Caveney | H01R 13/641 439/488 |
| 2008/0074282 | A1 * | 3/2008 | Koo | H04B 1/408 340/13.26 |
| 2008/0122579 | A1 * | 5/2008 | German | H01R 13/6683 340/10.1 |
| 2008/0150688 | A1 * | 6/2008 | Burr | G06K 19/0723 340/10.1 |
| 2008/0195180 | A1 * | 8/2008 | Stevenson | A61N 1/05 607/60 |
| 2008/0253556 | A1 * | 10/2008 | Cobb | H04Q 1/136 379/442 |
| 2008/0268898 | A1 * | 10/2008 | Willgert | G01S 13/758 455/556.1 |
| 2008/0315991 | A1 * | 12/2008 | Tuttle | H01Q 1/2225 340/10.1 |
| 2009/0058613 | A1 * | 3/2009 | Chung | H04Q 9/00 340/10.2 |
| 2009/0096581 | A1 * | 4/2009 | Macauley | H04Q 1/138 340/10.3 |
| 2009/0115609 | A1 * | 5/2009 | Weaver | G06Q 10/08 340/572.1 |
| 2009/0146787 | A1 * | 6/2009 | Park | G06K 7/0008 340/10.1 |
| 2009/0178119 | A1 * | 7/2009 | Macauley | H04L 12/467 726/4 |

(56) References Cited

U.S. PATENT DOCUMENTS

| | | | |
|---|---|---|---|
| 2009/0195360 A1* | 8/2009 | Jeon | H04B 5/0062 340/10.1 |
| 2009/0212917 A1* | 8/2009 | Chang | H04B 5/0062 340/10.1 |
| 2009/0224887 A1* | 9/2009 | Sadeghfam | G06K 7/10009 340/10.2 |
| 2009/0243857 A1* | 10/2009 | Sunagawa | B41J 2/17546 340/572.1 |
| 2009/0247126 A1* | 10/2009 | Rumpf | H04W 48/04 455/411 |
| 2010/0008482 A1* | 1/2010 | Tucker | H04Q 1/136 379/93.05 |
| 2010/0011097 A1* | 1/2010 | Cobb | H04Q 1/136 709/223 |
| 2010/0052856 A1* | 3/2010 | Macauley | G01S 5/14 340/10.1 |
| 2010/0085156 A1* | 4/2010 | Tucker | G06K 19/0717 340/10.1 |
| 2010/0085214 A1* | 4/2010 | Kim | G08G 1/14 340/932.2 |
| 2010/0098425 A1* | 4/2010 | Kewitsch | G02B 6/3895 398/116 |
| 2010/0109840 A1* | 5/2010 | Schilling | G06K 7/10346 340/10.1 |
| 2010/0109847 A1* | 5/2010 | Noel | G06K 7/0008 340/10.2 |
| 2010/0159953 A1* | 6/2010 | Aubert | G06K 19/07749 455/456.2 |
| 2010/0194544 A1* | 8/2010 | Yoo | G06K 7/0008 340/10.5 |
| 2010/0207736 A1* | 8/2010 | Park | G06K 7/0008 340/10.2 |
| 2010/0207737 A1* | 8/2010 | Park | G06K 7/0008 340/10.2 |
| 2010/0214073 A1* | 8/2010 | Kasai | G01S 13/38 340/10.2 |
| 2010/0244998 A1* | 9/2010 | Peyton | G01R 31/022 333/24 R |
| 2010/0259364 A1* | 10/2010 | Man | G06K 7/0008 340/10.1 |
| 2010/0271182 A1* | 10/2010 | Yashukova | G01R 31/043 340/10.1 |
| 2011/0012712 A1* | 1/2011 | Khozyainov | G01R 31/043 340/10.1 |
| 2011/0043371 A1* | 2/2011 | German | H04Q 1/136 340/815.45 |
| 2011/0074555 A1* | 3/2011 | Park | G06K 7/0008 340/10.4 |
| 2011/0097925 A1* | 4/2011 | Caveney | H04Q 1/149 439/488 |
| 2011/0133891 A1* | 6/2011 | Krug | G06K 7/0008 340/10.1 |
| 2011/0227707 A1* | 9/2011 | Zhu | G06K 7/0008 340/10.4 |
| 2011/0250839 A1* | 10/2011 | Lee | H04M 1/7253 455/41.1 |
| 2011/0266883 A1* | 11/2011 | Eray | H01Q 1/2225 307/104 |
| 2011/0309931 A1* | 12/2011 | Rose | E21F 17/18 340/539.13 |
| 2011/0309955 A1* | 12/2011 | Ahmadi | G06F 13/4072 341/22 |
| 2012/0004972 A1* | 1/2012 | Wengrovitz | G06Q 20/204 705/14.27 |
| 2012/0044054 A1* | 2/2012 | Hussain | G06K 7/10178 340/10.1 |
| 2012/0045928 A1 | 2/2012 | Caveney et al. | |
| 2012/0068830 A1 | 3/2012 | Caveney et al. | |
| 2012/0081209 A1* | 4/2012 | Brown | H04N 21/4126 340/10.1 |
| 2012/0094596 A1* | 4/2012 | Tysowski | G06Q 10/10 455/41.1 |
| 2012/0094597 A1* | 4/2012 | Tysowski | G06Q 10/10 455/41.1 |
| 2012/0187961 A1* | 7/2012 | Hashim | G01R 31/043 324/649 |
| 2012/0187964 A1* | 7/2012 | Michaelis | G01R 31/043 324/679 |

FOREIGN PATENT DOCUMENTS

| | | |
|---|---|---|
| CN | 102232310 A | 11/2011 |
| CN | 102648473 A | 8/2012 |
| WO | 2010111456 A1 | 9/2010 |
| WO | 2010111616 A1 | 9/2010 |

OTHER PUBLICATIONS

European Patent Office, "Extended European Search Report from EP Application No. 13833662.3 dated Mar. 22, 2016", from Foreign Counterpart to U.S. Appl. No. 13/798,517, Mar. 22, 2016, pp. 1-8, Published: EP.

International Searching Authority, "International Search Report and Written Opinion from PCT Application No. PCT/US2013/057468 dated Dec. 12, 2013", from Foreign Counterpart to U.S. Appl. No. 13/798,517, Dec. 12, 2013, pp. 1-9, Published: KR.

International Searching Authority, "Invitation to Pay Additional Fees from PCT Application No. PCT/US2012/056612 dated Feb. 7, 2013", from Foreign Counterpart to U.S. Appl. No. 13/243,454, Feb. 7, 2013, pp. 1-7, Published: EP.

International Searching Authority, "Notification of the Transmittal of the International Search Report and Written Opinion of the International Searching Authority from PCT Application No. PCT/US2012/056612 dated May 13, 2013", from Foreign Counterpart to U.S. Appl. No. 13/243,454, May 13, 2013, pp. 1-15, Published: WO.

State Intellectual Property Office, P.R. China, "First Office Action from CN Application No. 2013/80044777.1 dated Mar. 2, 2017", from Foreign Counterpart to U.S. Appl. No. 13/798,517, Mar. 2, 2017, pp. 1-20, Published: CN.

U.S. Patent and Trademark Office, "Office Action", U.S. Appl. No. 15/421,600, dated Nov. 13, 2017, pp. 1-49, Published: US.

State Intellectual Property Office, P.R. China, "Second Office Action from CN Application No. 201380044777.1 dated Jul. 19, 2017", from Foreign Counterpart to U.S. Appl. No. 13/798,517, Jul. 19, 2017, pp. 1-21, Published: CN.

State Intellectual Property Office, P.R. China, "Third Office Action from CN Application No. 201380044777.1 dated Nov. 1, 2017", from Foreign Counterpart to U.S. Appl. No. 13/798,517, Nov. 1, 2017, pp. 1-6, Published: CN.

U.S. Patent and Trademark Office, "Advisory Action", U.S. Appl. No. 13/798,517, dated Aug. 27, 2015, pp. 1-8, Published: US.

U.S. Patent and Trademark Office, "Final Office Action", U.S. Appl. No. 13/798,517, dated Feb. 3, 2016, pp. 1-24, Published: US.

U.S. Patent and Trademark Office, "Final Office Action", U.S. Appl. No. 13/798,517, dated May 13, 2015, pp. 1-19, Published: US.

U.S. Patent and Trademark Office, "Interview Summary", U.S. Appl. No. 13/798,517, dated Aug. 7, 2015, pp. 1-3, Published: US.

U.S. Patent and Trademark Office, "Notice of Allowance", U.S. Appl. No. 13/798,517, dated Jul. 13, 2016, pp. 1-18, Published: US.

U.S. Patent and Trademark Office, "Notice of Allowance", U.S. Appl. No. 13/798,517, dated Oct. 24, 2016, pp. 1-13, Published: US.

U.S. Patent and Trademark Office, "Notice of Allowance", U.S. Appl. No. 15/421,600, dated Feb. 20, 2018, pp. 1-12, Published: US.

U.S. Patent and Trademark Office, "Office Action", U.S. Appl. No. 13/243,454, dated May 21, 2013, pp. 1-16, Published: US.

U.S. Patent and Trademark Office, "Office Action", U.S. Appl. No. 13/798,517, dated Jan. 29, 2015, pp. 1-17, Published: US.

U.S. Patent and Trademark Office, "Office Action", U.S. Appl. No. 13/798,517, dated Sep. 10, 2014, pp. 1-23, Published: US.

U.S. Patent and Trademark Office, "Office Action", U.S. Appl. No. 13/798,517, dated Oct. 2, 2015, pp. 1-19, Published: US.

* cited by examiner

DETECTING PASSIVE RF COMPONENTS USING RADIO FREQUENCY IDENTIFICATION TAGS

CROSS REFERENCE TO RELATED APPLICATION

This application is a continuation of U.S. patent application Ser. No. 15/421,600 filed Feb. 1, 2017, entitled "Detecting Passive RF Components Using Radio Frequency Identification Tags", which is a continuation of U.S. patent application Ser. No. 13/798,517 filed Mar. 13, 2013, entitled "Detecting Passive RF Components Using Radio Frequency Identification Tags", which is a continuation-in-part of U.S. patent application Ser. No. 13/243,454, filed Sep. 23, 2011, entitled "Intelligent Patching Systems and Methods Using Radio Frequency Identification Tags that are Interrogated over Network Cabling and Related Communications Connectors," and claims priority to U.S. Provisional Application Ser. No. 61/695,362 filed Aug. 31, 2012 and titled "Detecting the Presence of Passive RF Components in a Distributed Antenna System Using RFID Tags," the contents of each of which are hereby incorporated by reference.

TECHNICAL FIELD

The present invention relates generally to communications systems and, more particularly, to automatically detecting passive components in communications systems.

BACKGROUND

Organizations such as businesses, government agencies, schools, etc. may employ dedicated communications systems (also referred to herein as "networks") that enable computers, servers, printers, facsimile machines, telephones, security cameras and the like to communicate with each other, through a private network, and with remote locations via a telecommunications service provider. Such communications systems may be hard-wired through, for example, the walls and/or ceilings of a building using communications cables and connectors. The communications cables may include insulated conductors such as copper wires that are arranged as twisted pairs of conductors. Individual communications connectors (which are also referred to herein as "connector ports" and/or as "outlets") such as RJ-45 style modular wall jacks are mounted in offices, conference rooms and other work areas throughout the building. The communications cables and any intervening connectors provide communications paths from the connector ports in offices and other rooms, hallways and common areas of the building (which are also referred to herein as "work area outlets") to network equipment (e.g., network switches, servers, etc.) that may be located in a computer room, telecommunications closet or the like. Communications cables from external telecommunication service providers may also terminate within the computer room or telecommunications closet.

In conductive wire-based communications systems, each information signal may be transmitted over a pair of conductors using differential signaling techniques rather than over a single conductor. Differential signaling involves transmitting signals on each conductor of the differential pair at equal magnitudes and opposite phases. An information signal is embedded as the voltage difference between the signals carried on the two conductors of the pair.

The conductive wire-based communication systems that are installed in both office buildings and data centers may use RJ-45 plugs and jacks to ensure industry-wide compatibility. Pursuant to certain industry standards (e.g., the TIA/EIA-568-B.2-1 standard approved Jun. 20, 2002 by the Telecommunications Industry Association), the eight conductors in RJ-45 plug and jack connectors are aligned in a row in the connection region where the contacts of the plug mate with the contacts of the jack. FIG. 1 is a schematic view of the front portion of an RJ-45 jack that illustrates the pair arrangement and positions of the eight conductors in this connection region that are specified in the type B configuration of the TIA/EIA-568-B.2-1 standard. As shown in FIG. 1, under the TIA/EIA-568 type B configuration, conductors 4 and 5 comprise differential pair 1, conductors 1 and 2 comprise differential pair 2, conductors 3 and 6 comprise differential pair 3, and conductors 7 and 8 comprise differential pair 4.

The communications cables that are connected to end devices (e.g., network servers, memory storage devices, network switches, work area computers, printers, facsimile machines, telephones, etc.) in communication systems may terminate into one or more communications patching systems. The communications patching systems may involve connectivity changes over time. The connections between the end devices and the network switches may need to be changed for a variety of reasons, including equipment changes, adding or deleting users, office moves, etc. A network manager may implement connectivity changes by simply unplugging one end of a patch cord or other communication cable from a first connector port on one of a set of patch panels and plugging that end of the patch cord into a second connector port on one of the patch panels.

The connectivity between the connector ports on the network switches and the work area outlets may be recorded in a computer-based log. Each time patching changes are made, this computer-based log is updated to reflect the new patching connections. Technicians may neglect to update the log each time a change is made, and/or may make errors in logging changes. As such, the logs may not be complete and/or accurate.

Systems and method are desirable to reduce or eliminate such logging errors or otherwise determine the connectivity of passive components in a network.

SUMMARY

Systems and methods are provided for automatically detecting passive components in communications systems using radio frequency identification ("RFID") tags.

In one aspect, a system is provided. The system includes a coupling circuit between a communications network and an RFID tag. The RFID tag is associated with a passive element of a distributed antenna system ("DAS"). The coupling circuit can allow an RFID signal received from an RFID transmitter over the communications network to be transported to the RFID tag. The coupling circuit can substantially prevent mobile communication signals on the communications network from being transported to the RFID tag.

In another aspect, a DAS is provided. The DAS includes a communications network, a RFID transmitter, an RFID tag, and a coupling circuit. The RFID transmitter is positioned in a remote antenna unit. The RFID tag is associated with a passive element remote from a position of the RFID transmitter over the communications network. The coupling circuit provides a physical coupling between the RFID tag and the communications network.

In another aspect, a method is provided. The method involves providing a coupling circuit between a communications network and an RFID tag associated with a passive element of a distributed antenna system. The method further involves transmitting an RFID signal received from an RFID transmitter to the RFID tag via the communications network and the coupling circuit. The coupling circuit substantially prevents mobile communication signals on the communications network from being communicated to the RFID tag. The method further involves detecting the presence of the passive element based on a responsive signal received by the RF transceiver from the RFID tag.

DETAILED DESCRIPTION

Figure 1:
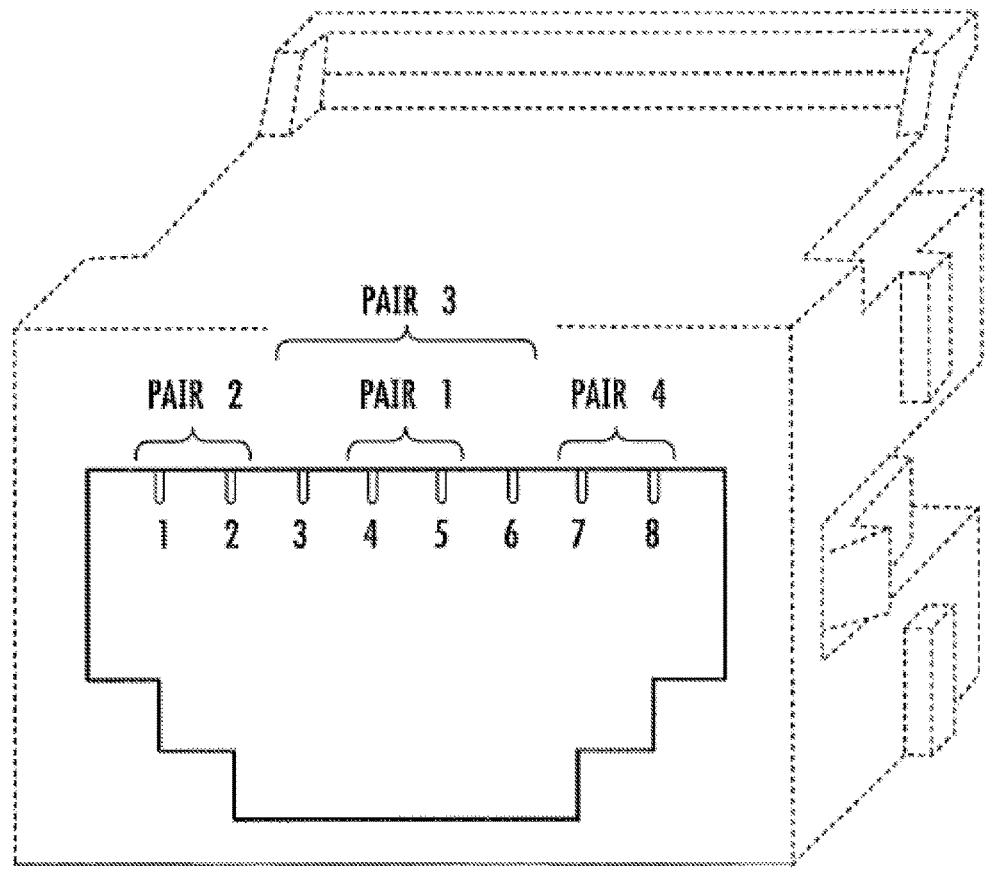
FIG. 1 is a schematic diagram illustrating a contact arrangement for a conventional eight-position communications jack as viewed from the front opening (plug aperture) of the jack.

Aspects and examples are disclosed for detecting passive RF components using radio frequency identification ("RFID") tags. For example, distributed antenna systems ("DAS") can be used in confined areas to deploy wireless coverage and capacity to mobile devices. A DAS can include active components configured to generate, process, and/or otherwise perform one or more operations on communicated signals in addition to communicating the signals. Non-limiting examples of active components include master units, extension units, and remote antenna units. A DAS can also include passive components configured for transceiving or otherwise communicating signals among active components. Non-limiting examples of passive components can include coaxial cable, RF splitters, RF combiners, RF antennas, optical fiber, optical splitters, optical combiners, connectors, jacks, wall jacks, patch cords, and the like. The presence of passive components can be identified through the employment of RFID tags.

In accordance with some aspects, an RFID transceiver can transmit a probing RF signal in one or more communication media of a DAS or other telecommunication system. A coupling circuit can be coupled to a waveguide (e.g., a coaxial cable, an optical fiber, or other type of waveguide) to communicate a guided wave (i.e., a signal) communicated via the waveguide to an RFID tag. Non-limiting examples of a coupling circuit include resonant coupling circuits, bandpass filters, low pass filters, high pass filters, directional couplers, non-directional couplers, and the like. The coupling circuit can maximize an amount of RF energy received by the RFID tag from an interrogator system or other RFID transceiver. The coupling circuit may include a physical connection to the DAS or other communications network and circuitry that can substantially prevent signals other than RFID signals and responsive signals from passing through the coupling circuit. The coupling circuit can thus block or reduce other signals used in the DAS at different frequencies than the frequency used by the RFID transceiver for transmitting probing signals. Blocking other signals at different frequencies can avoid or reduce generation of intermodulation products caused by non-linear characteristics of some RFID tags. Such intermodulation signals can be added at a harmful level to the RF signals communicated via the DAS, thereby causing distortion and/or blockage of signals communicated to wireless devices and other terminal equipment in a coverage area serviced by the DAS.

As used herein, the term "RFID tag" is used to refer to any item that can respond to an RFID signal with a responsive signal representing an identifier for the item.

In some aspects, a DAS is provided that includes one or more passive components. Each passive component can be associated with a RFID tag. The RFID tag may be integrated into the passive component or may be coupled, connected, or otherwise associated with the passive component. A reader or other RF transceiver may be integrated within or otherwise associated with a sub-system of the DAS that is remote from at least some of the passive components. The reader can transceive RFID signals over a communications network of the DAS. The communications network may include, for example, coaxial cable or another transmission medium that can carry RF signals and RFID signals through the DAS. For example, the reader may transmit an RFID signal that is carried by the communications network through a coupling circuit to the RFID tag associated with a passive component. The RFID tag can respond to the RFID signal with a responsive signal representing an identifier of the passive component. The responsive signal can be received from the coupling circuit and transported by the communications network to the reader. The reader may extract the identifier from the responsive signal and provide the identifier to a controller. The passive component may not be required to be powered for a reader to detect the presence of the passive component. Receiving identifiers of passive components of a DAS can allow a diagram to be generated that represents a location of the passive components within the DAS and/or losses may be identified.

In additional or alternative aspects, the coupling circuit can include an air interface between the communications network and/or passive component and the RFID tag. In some aspects, both the reader and the RFID tag may be configured to be in a fixed position within the DAS, as opposed to the reader being moveable. In other aspects, the reader includes two or more readers in which one or more readers are moveable.

In additional or alternative aspects, methods and systems (and related equipment) are disclosed for automatically tracking cabling connections in a communications system are provided in which RFID tags are installed at the connector ports of the communications system. In order to track cabling connections in these communications systems, one or more RFID transceivers may be used to transmit RFID interrogation signals over the cabling to excite the RFID tags at several of the connector ports of the communications system. In response to these RFID interrogation signals, the RFID tags may emit responsive RFID signals that are transmitted back to an RFID transceiver over the cabling. The responsive RFID signals may include, for example, unique identifiers that identify the connector ports that are associated with each RFID tag. These identifiers may be used to identify or "track" patching connections between patch panel connector ports and/or to track horizontal cabling connections between patch panel connector ports and work area outlets.

Both the RFID interrogation signals and the responsive RFID signals (which are collectively referred to herein as "RFID control signals") that are used to identify a cabling connection between two connector ports may be transmitted over one or more of the twisted pairs of conductors (which may also be referred to herein as a "differential pair" or simply a "pair") of the communications cabling that extends between the two connector ports. The RFID control signals may be coupled to and from the differential pair(s) in a variety of different ways, including capacitive coupling, inductive coupling and/or by using a resonant coupling network.

The RFID control signals may be transmitted over the conductive paths that carry the underlying network traffic. Various different techniques may be used to isolate the RFID control signals from the underlying network traffic. In some aspects, the RFID control signals may be transmitted outside the frequency band that is used to carry the underlying network traffic in order to reduce and/or minimize interference between the RFID control signals and the network traffic. In other aspects, the RFID control signals may be transmitted over one of the differential pairs that is included within the cabling as a common mode signal (i.e., as the port of a signal transmitted between two devices over the conductors of a pair that is extracted by taking the voltage average of the signals carried on the conductors of the pair). As the differential signal is extracted from the differential pair by taking the difference between the signals carried by the two conductors, the common mode RFID control signal is removed by this subtraction process, and hence theoretically does not interfere with the differential signal. Likewise, since the equal but opposite components of the differential signal cancel out during the averaging process used to recover the common mode signal, the differential signal does not (theoretically) interfere with the common mode signal. In still further aspects, the RFID control signals may be transmitted over two or more of the twisted pairs in the cabling as so-called "phantom mode" signals. A phantom mode signal refers to a differential signal whose positive and negative components are each transmitted as a common mode signal on at least one pair of conductors (and hence is transmitted over at least four conductors). As phantom mode signals use common mode signaling techniques, phantom mode signals likewise do not (theoretically) interfere with differential network traffic signals that may be simultaneously transmitted over the pairs. In still other aspects, the conductive paths may be sensed, and the RFID control signal may only be transmitted during time periods when there is no underlying network traffic. Thus, one or more of a variety of different techniques may be used according to aspects of the present invention to isolate the RFID control signals from the underlying network traffic that is carried over the same conductors.

As the RFID control signals may be transmitted on the same conductive paths that carry the underlying network traffic, in some aspects of the present invention, standard cabling and patch cords may be used, which can reduce the overall costs of these solutions and increase the convenience of the solution to customers. Moreover, as RFID tags are passive devices that draw their operating power from the RFID interrogation signals, the connector ports according to aspects of the present invention may not require a separate power source. As such, the intelligent tracking capabilities may be extended to connector ports that do not have power connections such as most modular wall jacks in the work areas.

The methods and systems disclosed herein may be used to track patching connections between two patch panel fields (i.e., in cross-connect patching systems) and/or may be used to track horizontal cabling connections between a patch panel field and a plurality of work area outlets. Additionally, in some aspects, "interposer" connectors and/or customized patch cords may be used that may allow tracking patch cord connections between a plurality of patch panels and a plurality of network switches (i.e., in inter-connect patching systems) and even to track connections all the way to end devices in the work area and/or in the computer room.

Detailed descriptions of these aspects and examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present invention.

Figure 2:
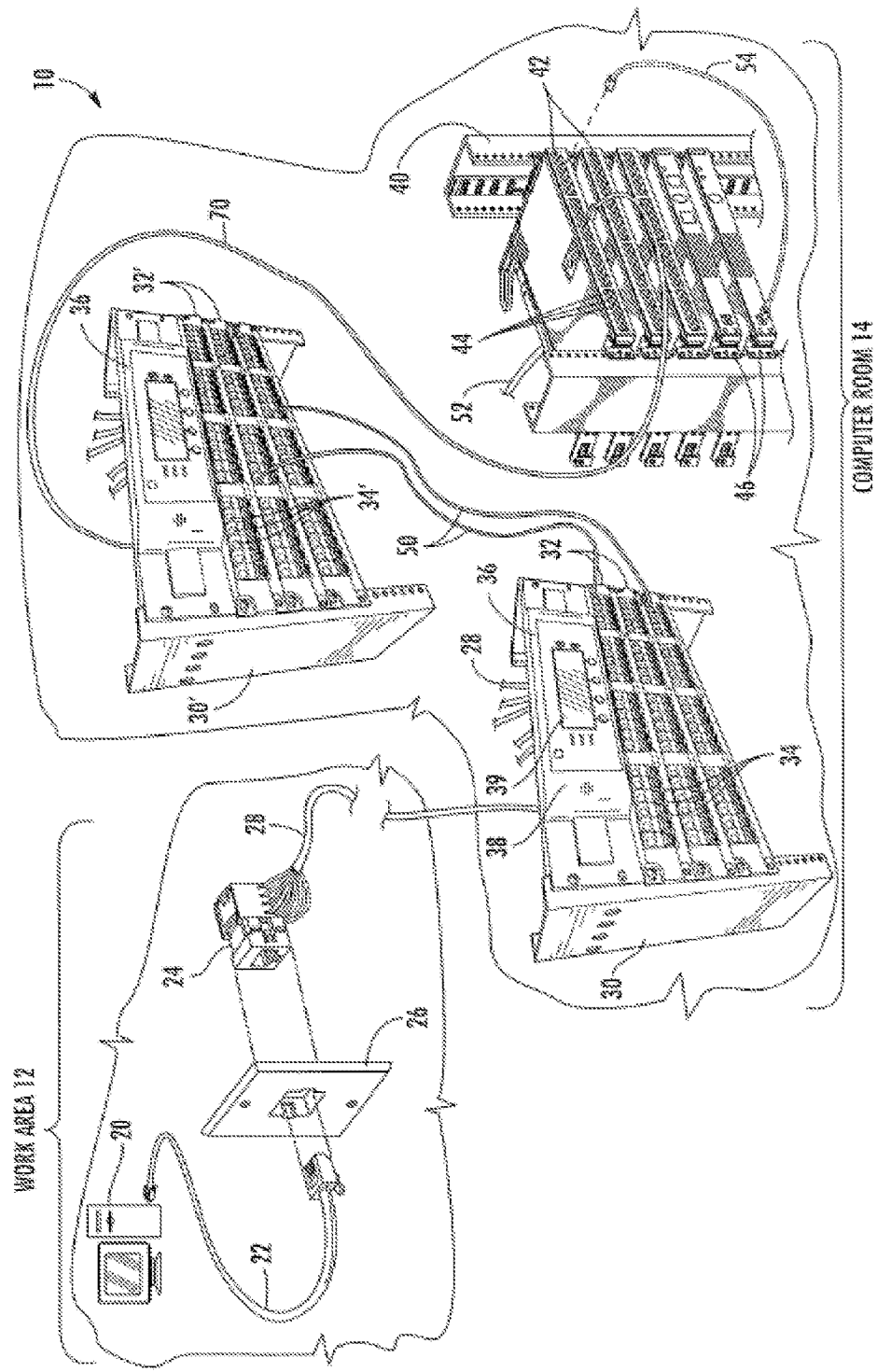
FIG. 2 is a simplified, schematic view of an example cross-connect communications system on which the radio frequency identification ("RFID") tracking techniques according to one aspect.

FIG. 2 is a schematic view of an example cross-connect communications system 10 that may be used to connect computers, printers, Internet telephones and other end devices that are located in work areas 12 throughout a building to network equipment that is located, for example, in a computer room 14 of the building. The RFID tracking techniques discussed herein may be used to track various cabling connections in the communications system 10 of FIG. 2, as will be discussed in detail below.

As shown in FIG. 2, an example computer 20 or other end device is located in the work area 12 of the building. The computer 20 is connected by a patch cord 22 to a modular wall jack 24 that is mounted in a wall plate 26 in work area 12. A communications cable 28 is routed from the back end of the wall jack 24 through, for example, the walls and/or ceiling of the building, to a computer room 14. As there may be hundreds or thousands of work area wall jacks 24 in an office building, a large number of cables 28 may be routed into the computer room 14. While only a single work area end device (computer 20) is shown in FIG. 2 to simplify the drawing, it will be appreciated that there may be dozens, hundreds or thousands of work area end devices in a communications system.

A first equipment rack 30 is provided in the computer room 14. A plurality of patch panels 32 are mounted on the first equipment rack 30. Each patch panel 32 includes a plurality of connector ports 34. Each cable 28 from the wall jacks 24 in the work area 12 is terminated onto the back end of one of the connector ports 34 of one of the patch panels 32. In FIG. 2, each connector port 34 comprises an RJ-45 jack. However, it will be appreciated that other types of connector ports may be used such as, for example, RJ-11 connector ports.

A communications patching system includes one or more "patch panels" that are mounted on equipment rack(s) or in cabinet(s), and a plurality of "patch cords" that are used to make interconnections between different pieces of equipment. As is known to those of skill in the art, a "patch cord" refers to a communications cable (e.g., a cable that includes four differential pairs of copper wires or a fiber optic cable) that has a connector such as, for example, an RJ-45 plug or a fiber optic connector, on at least one end thereof. A "patch panel" refers to an inter-connection device that includes a plurality (e.g., 24 or 48) of connector ports. Each connector port (e.g., an RJ-45 jack or a fiber optic adapter) on a patch panel may have a plug aperture on a front side thereof that is configured to receive the connector of a patch cord (e.g., an RJ-45 plug), and the back end of each connector port may be configured to receive a communications cable or a connector of a patch cord. With respect to RJ-45 connector ports, each communications cable can be terminated into the back end of the RJ-45 connector port by terminating the eight conductive wires of the cable into corresponding insulation displacement contacts ("IDCs") or other wire connection terminals of the connector port. Consequently, each RJ-45 connector port on a patch panel acts to connect the eight conductors of the patch cord that is plugged into the front side of the connector port with the corresponding eight conductors of the communications cable that is terminated into the back end of the connector port. The patching system may optionally include a variety of additional equipment such as rack managers, system managers and other devices that facilitate making and/or tracking patching connections.

In an office network, "horizontal" cables can be used to connect each work area outlet (which can be RJ-45 jacks) to the back end of a respective connector port (which may be RJ-45 jacks) on a first set of patch panels. The first end of each of these horizontal cables is terminated into the IDCs of a respective one of the work area outlets, and the second end of each of these horizontal cables is terminated into the IDCs of a respective one of the connector ports on the patch panel. In an "inter-connect" patching system, a single set of patch cords is used to directly connect the connector ports on the first set of patch panels to respective connector ports on network switches. In a "cross-connect" patching system, a second set of patch panels is provided, and the first set of patch cords is used to connect the connector ports on the first set of patch panels to respective connector ports on the second set of patch panels. The second set of single-ended patch cords can used to connect the connector ports on the second set of patch panels to respective connector ports on the network switches. In both inter-connect and cross-connect patching systems the cascaded set of plugs, jacks and cable segments that connect a connector port on a network switch to a work area end device can be referred to as a channel. Thus, if RJ-45 jacks are used as the connector ports, each channel includes four communications paths (since each jack and cable has four differential pairs of conductors).

A rack controller 36 may also be mounted on the first equipment rack 30. The rack controller 36 may include a central processing unit ("CPU") 38 and a display 39. The rack controller 36 may be interconnected with rack controllers that are provided on other patch panel equipment racks of the communications system (only two such rack controllers 36 are shown in the example of FIG. 2) so that the rack controllers 36 can communicate in a common network as if they were a single controller. The CPU 38 of rack controller 36 may include a remote access port that enables the CPU 38 to be accessed by a remote computer such as, for example, a system administrator computer (not shown in FIG. 2). The rack controller 36 may, for example, gather data from intelligent tracking capabilities of the patch panels 32, as will be explained herein.

The communications patching system 10 further includes a second set of patch panels 32' that are mounted on a second equipment rack 30'. Each patch panel 32' includes a plurality of connector ports 34', and a rack controller 36 may also be mounted on the second equipment rack 30'. A first set of patch cords 50 is used to interconnect the connector ports 34 on the patch panels 32 to respective ones of connector ports 34' on the patch panels 32'.

As is further shown in FIG. 2, network devices such as, for example, one or more network switches 42 and network routers and/or servers 46 are mounted, for example, on a third equipment rack 40. Each of the switches 42 may include a plurality of connector ports 44, and each network router and/or server 46 may also include one or more connector ports. One or more external communications lines 52 are connected to at least some of the network devices 46 (either directly or through a patch panel that is not shown in FIG. 2). A second set of single-ended patch cords 70 connects the connector ports 44 on the switches 42 to respective ones of the back ends of the connector ports 34' on the patch panels 32'. A third set of patch cords 54 may be used to interconnect other of the connector ports 44 on the switches 42 with the connector ports provided on the network routers/servers 46. In order to simplify FIG. 2, only two patch cords 50, a single patch cord 70 and a single patch cord 54 are shown. The communications patching system of FIG. 2 may be used to connect each work area computer 20 or other work area end device to the network switches 42, the network switches 42 to the network routers and servers 46, and the network routers/servers 46 to external communications lines 52, thereby establishing the physical connectivity required to give devices 20 access to both local and wide area networks. In the cross-connect patching system of FIG. 2, connectivity changes can be made by rearranging the patch cords 50 that interconnect the connector ports 34 on the patch panels 32 with respective of the connector ports 34' on the patch panels 32'. It should also be noted that in many cases the patching connections may be between patch panels that are mounted on the same equipment rack or even between connector ports on the same patch panel. Thus, it will be understood that FIG. 2 illustrates the work area outlets being connected to patch panels that are on a first equipment rack and the network switches being connected to patch panels on a second equipment rack to provide a simple, easy to understand example. The present invention is not limited to such configurations.

As will be discussed in more detail below, the RFID signaling techniques according to aspects of the present invention may be used to automatically determine and/or confirm patching connections between the patch panels mounted on the first equipment rack 30 and the patch panels mounted on the second equipment rack 30' of FIG. 2, thereby allowing a network administrator to automatically generate and subsequently maintain the computer-based log of patching connections for communications system 10. These RFID signaling techniques may also be used to track the horizontal cabling connections between the connector ports 32 on the first equipment rack 30 and the modular wall jacks 24. Moreover, in some aspects, interposers and/or specialized patch cords may be used that may allow the communications system 10 to also automatically track connections between the patch panels 32' on the second equipment rack 30' and the network switches 42 on the third equipment rack 40 and/or between the modular wall jacks 24 and the work area end devices 20, as will be explained in further detail below.

Herein, the term "Ethernet cable" refers to a cable that includes at least four twisted pairs of insulated conductors, where each twisted pair is configured to carry a differential signal and is suitable for use as a transmission medium for computer communications. The term "Ethernet cabling connection" refers to one or more Ethernet cables and any intervening connectors that define a channel between two connectors (or end devices). Thus, for example, in the cross-connect system of FIG. 2, the Ethernet cabling connection between modular wall jack 24 and the connector port on switch 42 that it is connected to include horizontal cable 28, a connector port 34 on one of the patch panels 32, one of the patch cords 50, a connector port 34' on one of the patch panels 32', and one of the single-ended patch cords 70.

Figure 3:
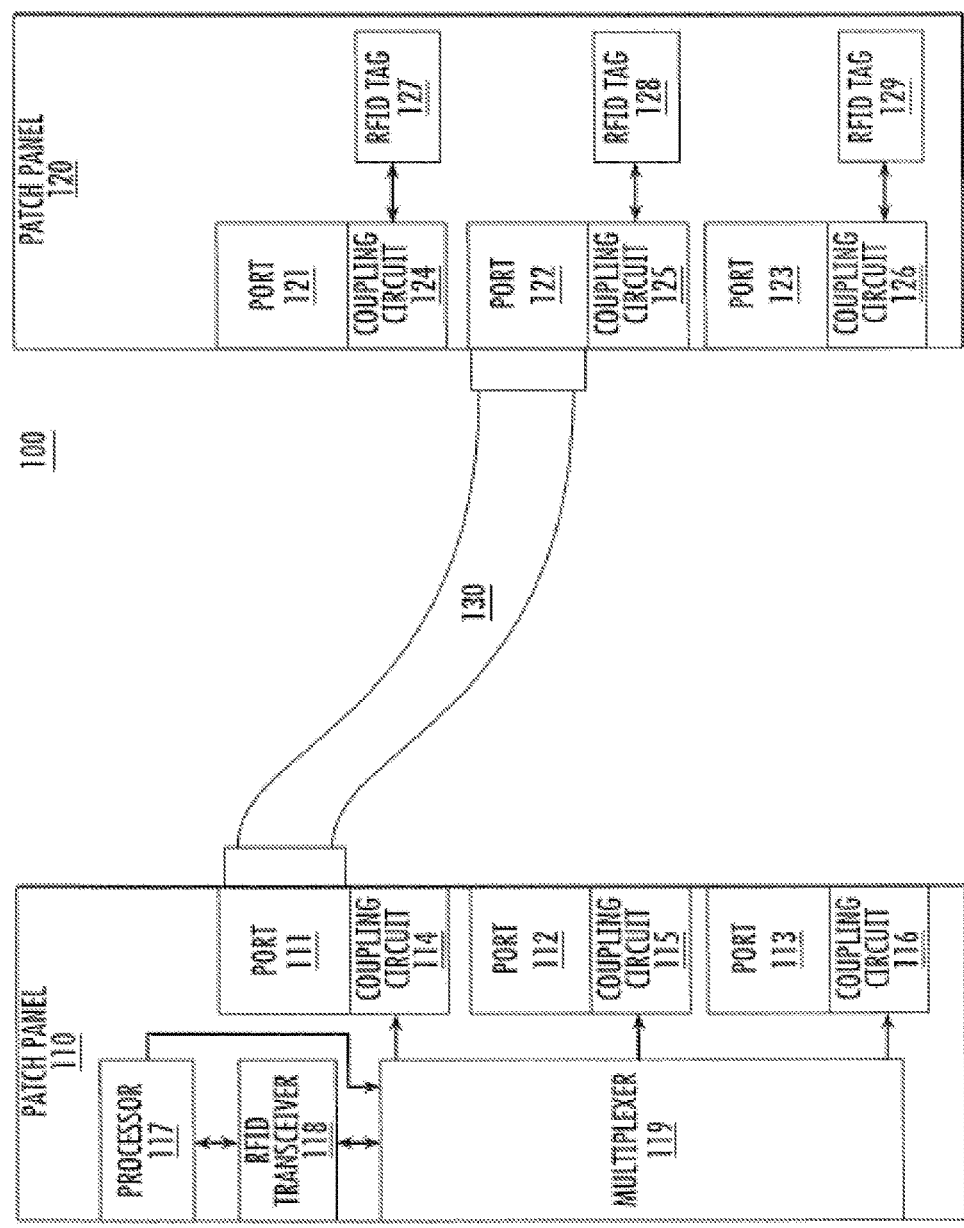
FIG. 3 is a block diagram of a patching connection between two patch panels of a communications system that illustrates how RFID control signals can be used to automatically track patching connections according to one aspect

FIG. 3 is a block diagram illustrating a simplified communications patching system 100 according to certain aspects of the present invention. The discussion below explains how RFID control signals may be transmitted over the cabling of the communications system 100 in order to track patch cord and/or horizontal cabling connections in the system 100 according to aspects of the present invention.

Referring to FIG. 3, the communications patching system 100 includes a first patch panel 110 that has connector ports 111, 112, 113 and a second patch panel 120 that has connector ports 121, 122, 123. The patch panel 110 may correspond to one of the patch panels 32 in FIG. 2, and the patch panel 120 may correspond to one of the patch panels 32' in FIG. 2. In order to simplify the drawing, patch panels 110, 120 are depicted as having only three connector ports each. It will be appreciated, however, that most conventional patch panels have a larger number of connector ports, with 24-port and 48-port patch panels being the most commonly used patch panels in the industry. Each of the connector ports 111-113 and 121-123 may be an RJ-45 jack that has four differential pairs of conductive paths that may be used to connect the conductors of a patch cord that is plugged into the plug aperture of the jack to the corresponding conductors of a horizontal cable that is terminated into the back end wire connection assembly of the jack.

An example patch cord 130 is depicted in FIG. 3 that connects connector port 111 on patch panel 110 to connector port 122 on patch panel 120. The patch cord 130 may be used, for example, as one of the patch cords 50 of FIG. 2. While not shown in FIG. 3, it will be appreciated that the back ends of the connector ports 111-113 on the patch panel 110 may be connected by horizontal cables to, for example, work area outlets such as modular wall jack 24 (see FIG. 2), and that the back ends of the connector ports 121-123 on the patch panel 120 may be connected by one-ended patch cords to, for example, connector ports on one or more network switches 42 (see FIG. 2).

As is also shown in FIG. 3, a processor 117, an RFID transceiver 118, and a multiplexer 119 may be mounted on patch panel 110. Herein, the processor 117, the RFID transceiver 118 and the multiplexer 119 may be referred to generically as "RFID signaling circuitry."

The processor 117 may be any suitable microprocessor, controller, application specific integrated circuit or the like. The processor 117 may control various control signaling operations that are used to identify cabling connections that run through the connector ports 111-113 on patch panel 110. The processor 117 may be in communication with processor 38 of FIG. 2 or, in some aspects, the processor 38 of FIG. 2 may carry out the operations of processor 117.

The RFID transceiver 118 may be any appropriate RFID transceiver that is configured to, for example, generate an RFID interrogation signal that may be used to excite an RFID tag. The RFID transceiver 118 may also receive and/or read a responsive RFID signal that is transmitted by an RFID tag in response to an RFID interrogation signal. The RFID transceiver 118 may generate an RFID interrogation signal in response to a control signal from the processor 117. The RFID interrogation signal that is generated by the RFID transceiver 118 in response to such a control signal may be passed to the multiplexer 119. The RFID transceiver 118 may also receive responsive RFID signals that are passed to the RFID transceiver 118 through the multiplexer 119. The RFID transceiver 118 may pass data that is embedded in any received responsive RFID signals to the processor 117.

The multiplexer 119 may receive RFID interrogation signals from the RFID transceiver 118 and pass those RFID interrogation signals to a selected one of a plurality of coupling circuits 114, 115, 116. The multiplexer 119 may likewise receive responsive RFID signals that are extracted from the respective channels at the coupling circuits 114, 115, 116 and pass these signal to the RFID transceiver 118. The multiplexer 119 may comprise, for example, an analog multiplexer that is configured to pass signals in the frequency ranges of the RFID control signals discussed herein. In some aspects, the multiplexer 119 may be replaced with a switching circuit. Various examples of switching circuits that may be used to selectively connect an RFID transceiver to the connector ports on a patch panel in place of the multiplexer 119 of FIG. 3 are described in U.S. patent application Ser. No. 11/871,448, filed Oct. 12, 2007 and published as U.S. Patent Publication No. 2009/0096581, the entire contents of which is incorporated herein by reference. In some aspects, the multiplexer 119 (or alternative switching circuit) may be omitted (e.g., by providing a separate RFID transceiver 118 for each coupling circuit 114, 115, 116).

The coupling circuits 114, 115, 116 are provided to couple RFID control signals between the RFID signaling circuitry 117, 118, 119 and the respective channels that run through connector ports 111, 112, 113. For example, an RFID interrogation signal that is generated by RFID transceiver 118 may be routed by the multiplexer 119 to an output thereof that is connected to, for example, coupling circuit 114. The appropriate output of the multiplexer 119 is selected based on a control signal that is provided to the multiplexer 119 from the processor 117. The coupling circuit 114 couples the RFID interrogation signal that is received from the multiplexer 119 onto one of the differential pairs of conductors of the channel that passes through connector port 111. In some aspects, the RFID interrogation signal may be coupled as a phantom mode control signal that is coupled onto two (or more) of the four differential pairs of conductive paths through the connector port 111. The coupling circuits 114, 115, 116 likewise are used to extract responsive RFID signals from the channel that are transmitted by an RFID tag in response to an RFID interrogation signal so that these signals may be passed to the RFID transceiver 118 via the multiplexer 119. Example coupling circuits are discussed below with reference to FIGS. 8-12.

As is further shown in FIG. 3, the second patch panel 120 includes coupling circuits 124-126 that are associated with connector ports 121-123, respectively. As noted above, example coupling circuit designs are illustrated below with respect to FIGS. 8-12. The coupling circuits 124-126 may be used to couple RFID interrogation signals from the channels associated with connector ports 121-123, respectively, and pass those RFID interrogation signals to a respective RFID tag 127-129. The coupling circuits 124-126 likewise may be used to inject responsive RFID signals that are transmitted by RFID tags 127-129, respectively, onto the channels associated with the respective connector ports 121-123.

The RFID tags 127-129 may each comprise a small integrated circuit chip that is mounted, for example, within or adjacent to its respective connector port 121-123. The RFID tags 127-129 may each have a computer memory in which data may be stored specifically including, for example, a unique identifier. The RFID tags 127-129 are designed to receive an RFID interrogation signal from the RFID transceiver 118 (or another RFID transceiver) which is used to energize or "excite" the RFID tag 127-129. The excited RFID tags 127-129 transmit a responsive signal that may include the data (e.g., the unique identifier) that is stored in the memory of the RFID tag 127-129. The RFID tags 127-129 may not require a separate power source, as they may be designed to use the energy from the received RFID interrogation signal to transmit the responsive RFID signal. As will be discussed in greater detail herein, the RFID tags 127-129 may differ from many conventional RFID tags in that they may be designed to be energized via a hard-wired (as opposed to wireless) connection, and as they may transmit their responsive signal over the hard-wired connection.

Figure 4:
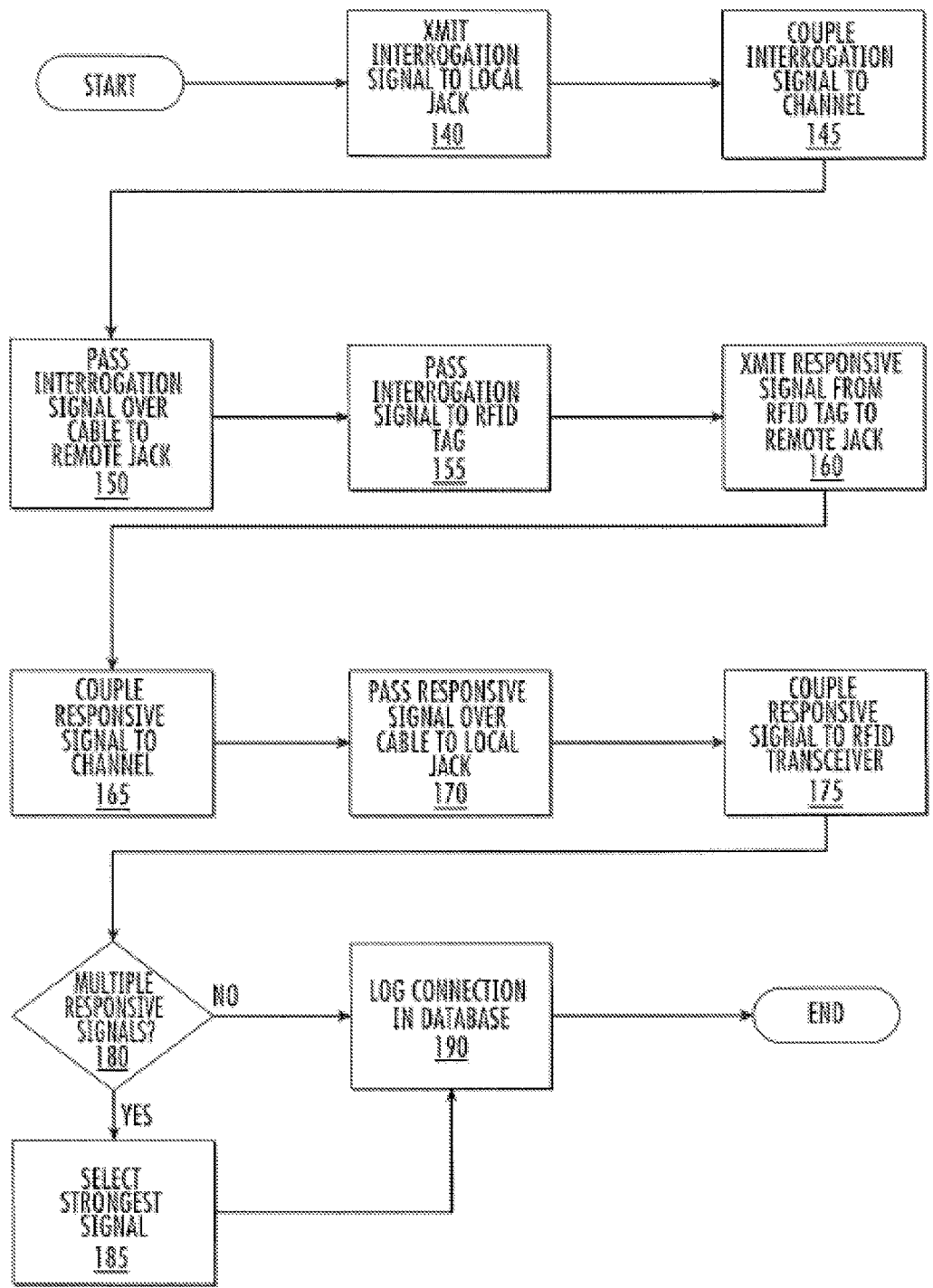
FIG. 4 is a flow chart illustrating methods of automatically identifying patching connections according to one aspect.

FIG. 4 is a flow chart illustrating operations according to aspects of the present invention that may be used to identify a cabling connection between the first connector port 111 on patch panel 110 (the "local jack") and the second connector port 122 (the "remote jack") on patch panel 120 of the communications system 100 of FIG. of FIG. 3.

Referring to FIGS. 3 and 4, operations may begin with the RFID transceiver 118 transmitting an RFID interrogation signal to the first connector port 111 (block 140). This RFID interrogation signal may be transmitted, for example, in response to a control signal that is transmitted to the RFID transceiver 118 by the processor 117. In aspects that share the RFID transceiver 118 amongst multiple connector ports (such as the aspect of FIG. 3), the multiplexer 119 or another appropriate switching circuit may be used to route the RFID interrogation signal to the appropriate connector port 111. The multiplexer 119 may be controlled, for example, by control signals that are received from the processor 117.

In some aspects, the RFID interrogation signal may be transmitted at a frequency that is outside the frequency band used to transmit the regular network traffic that is carried by the communication system. For example, Ethernet signals according to the IEEE 802.3 series are transmitted at frequencies between 0.15 and 800 MHz with a 3 dB roll-off at approximately 400 MHz for a 10 Gigabit/second Ethernet signal ("the Ethernet spectrum"). The upper and lower frequency limits of the Ethernet spectrum are subject to change as the relevant standards evolve. In order to reduce possible interference between the RFID interrogation signal and the underlying network traffic that is carried as differential signals on the channels of the communications system, the RFID interrogation signals may be transmitted, for example, at frequencies below 0.15 MHz (e.g., at about 140 kHz) or at frequencies above 400 MHz (e.g., at frequencies of about 800 MHz). However, at frequencies below 0.15 MHz, the supportable data rate for the RFID control signals may be low, and mode conversion and/or attenuation may increase substantially at frequencies above 400 MHz. Thus, it will be appreciated that, in other aspects, the RFID interrogation signal may be transmitted as common mode or phantom mode signals at frequencies that are within the Ethernet spectrum, and the inherent isolation between common mode/phantom mode signals and underlying differential information signals (or other appropriate isolation techniques) may be relied upon for keeping interference between the RFID interrogation signal and the underlying information signals at acceptable levels. In still further aspects, the RFID interrogation signal may be transmitted within the Ethernet spectrum, but only during time periods where there is no underlying network traffic on the channel.

The RFID interrogation signal that is received at the connector port 111 is next coupled onto the channel that runs through connector port 111 (block 145). Coupling circuit 114 in FIG. 3 is used to couple the RFID interrogation signal onto this channel. As will be discussed in greater detail herein with respect to FIGS. 8-12, resonant coupling circuits, capacitive coupling circuits and/or inductive coupling circuits may be used in some aspects to couple the RFID interrogation signal onto the channel.

The coupling circuit 114 may couple or "inject" the RFID interrogation signal onto one or more of the eight conductive paths that run through connector port 111 (which, as noted above, are configured as four differential pairs of conductive paths). In some aspects, the RFID interrogation signal may be injected as a common mode signal onto, for example, one of the differential pairs of conductive paths. In other aspects, the RFID interrogation signal may be injected as a phantom mode signal that has a first component that is transmitted over a first of the differential pairs of conductive paths as a common mode signal and a second component—that has a polarity that is opposite the first component—that is transmitted as a common mode signal over a second of the differential pairs of conductive paths. As noted above, for a signal such as an RFID interrogation signal is transmitted on one or more differential pairs of conductors using common mode or phantom mode signaling techniques, the common mode/phantom mode signal theoretically should not interfere with any underlying differential information signals that are being transmitted over the differential pair(s). In still other aspects, the RFID interrogation signal may be transmitted at a frequency that is outside the frequency range of the regular network traffic that is carried by the communication system 100 and/or during time periods when no network traffic is present on the channel. Accordingly, in each of the above-described aspects, the RFID interrogation signal may be transmitted over a channel simultaneously with any data signals that are transmitted over the channel.

Once the RFID interrogation signal is injected into the channel at the first connector port 111, it will be transmitted over the patch cord 130 to the second connector port 122 (block 150). The RFID interrogation signal is extracted from the channel at the second connector port 122 using the coupling circuit 125 which, in turn, provides the RFID interrogation signal to the RFID tag 128 (block 155). The coupling circuit 125 may be implemented, for example, using any of the circuits described herein that may be used to implement coupling circuit 114.

The RFID interrogation signal is designed to excite the RFID tag 128. As described above, an excited RFID tag 128 can be configured to emit a responsive RFID signal. This responsive RFID signal may include information that is stored in a memory of the RFID tag 128. In some aspects, the memory of the RFID tag 128 may include a unique identifier that identifies the second connector port 122. The memory may also include other information such as, for example, location information for the second connector port 122. Thus, in response to the RFID interrogation signal, the RFID tag 128 transmits a responsive RFID signal that includes the unique identifier from the memory of the RFID tag 128 to the second connector port 122 (block 160).

The responsive RFID signal may be coupled onto one or more of the four differential pairs of conductive paths of the second connector port 122 (block 165). In some aspects, the responsive RFID signal may be coupled as a common mode signal onto, for example, one of the differential pairs of conductive paths. In other aspects, the responsive RFID signal may be coupled as a phantom mode signal onto two of the differential pairs of conductive paths. In still other aspects, the responsive RFID signal may be coupled as a differential signal onto one of the differential pairs of conductive paths, where the frequency of the responsive RFID signal is outside the frequency range of the regular network traffic that is carried by the communication system 100 (i.e., outside the Ethernet spectrum) and/or during time periods when no regular network traffic is present on the channel. In each of these cases, the responsive RFID signal should not substantially interfere with any underlying differential information signals that are being transmitted over the channel.

Once the responsive RFID signal is injected onto the conductive paths of the second connector port 122, it passes to the corresponding conductive paths of the first connector port 111 over the conductors of the patch cord 130 (block 170). The responsive RFID signal is can be extracted from the channel at the first connector port 111 by the coupling circuit 114 and provided to the RFID transceiver 118 via the multiplexer 119 (block 175).

In some cases, multiple responsive RFID signals may be received at the RFID transceiver 118 from the channel that runs between the first connector port 111 and the second connector port 122 (block 180). This may occur, for example, because a responsive RFID signal from another channel may couple into the channel at issue (e.g., by coupling from one patch cord to an adjacent patch cord for multiple patch cords are bundled together). If multiple responsive RFID signals are received, the RFID transceiver 118 may select the responsive RFID signal that has the largest received signal strength as being the signal that was forwarded from the second connector port 122 (block 185), as signals that are capacitively or inductively coupled though, for example, the cabling should have significantly lower received signal strengths. Next, the unique identifier in the responsive RFID signal (or of the selected responsive RFID signal, if multiple responsive RFID signals are received) is used to identify the patch cord connection between connector ports 111 and 122, and this connection may be logged in a connectivity database (block 190). Operations for identifying the patching connection between the first connector port 111 and the second connector port 122 may be completed.

A number of approaches have been proposed for using RFID tags to track cabling connections in communications systems. Examples of such approaches are disclosed in U.S. Pat. Nos. 6,002,331, 7,170,393 and 7,605,707. The other proposed approaches may embed an RFID tag in each plug of the patch cords of a communications system (where the RFID tags on each end of a given patch cord include the same identifier). One or more RFID transceivers are mounted on each patch panel, and various RFID antenna arrangements have been proposed which may be used to wirelessly transmit RFID interrogation signals to the RFID tags in any plugs that are connected to the patch panel and to receive responsive RFID signals that are transmitted by these RFID tags and forward the received signals to the RFID transceiver. By sending out a series interrogation signals, these systems can identify the specific patch cord plug that is inserted into each connector port on the patch panel. If such tracking is done at each patch panel in the communications system, the patch cord connections between the various patch panel connector ports may be identified.

In contrast to these previously proposed approaches, aspects of the present invention associate each RFID tag with a specific connector port as opposed to with a patch cord plug. As a result, the need for specialized patch cords that have RFID tags embedded therein may be eliminated in various of the aspects disclosed herein. Moreover, as the RFID tags are located at the connector ports as opposed to in the patch cord plugs, the communications systems according to aspects of the present invention may track cabling connections through horizontal cabling connections (which may not include plugs), thereby allowing tracking of connections into the work areas. Additionally, as the RFID control signals are transmitted using the cabling as a transmission media as opposed to the air interface used in prior approaches, the possibility of false positives that may occur in the prior approaches when an RFID antenna associated with a first connector port excites an RFID tag on a plug that is inserted within an adjacent connector port may be reduced or eliminated. Moreover, the use of the cabling as a transmission medium for the RFID control signals allows using RFID transceivers that are located at one location (e.g., within a computer room) to interrogate RFID tags that are located at remote locations (e.g., at work area outlets or even at work area end devices).

Figure 5:
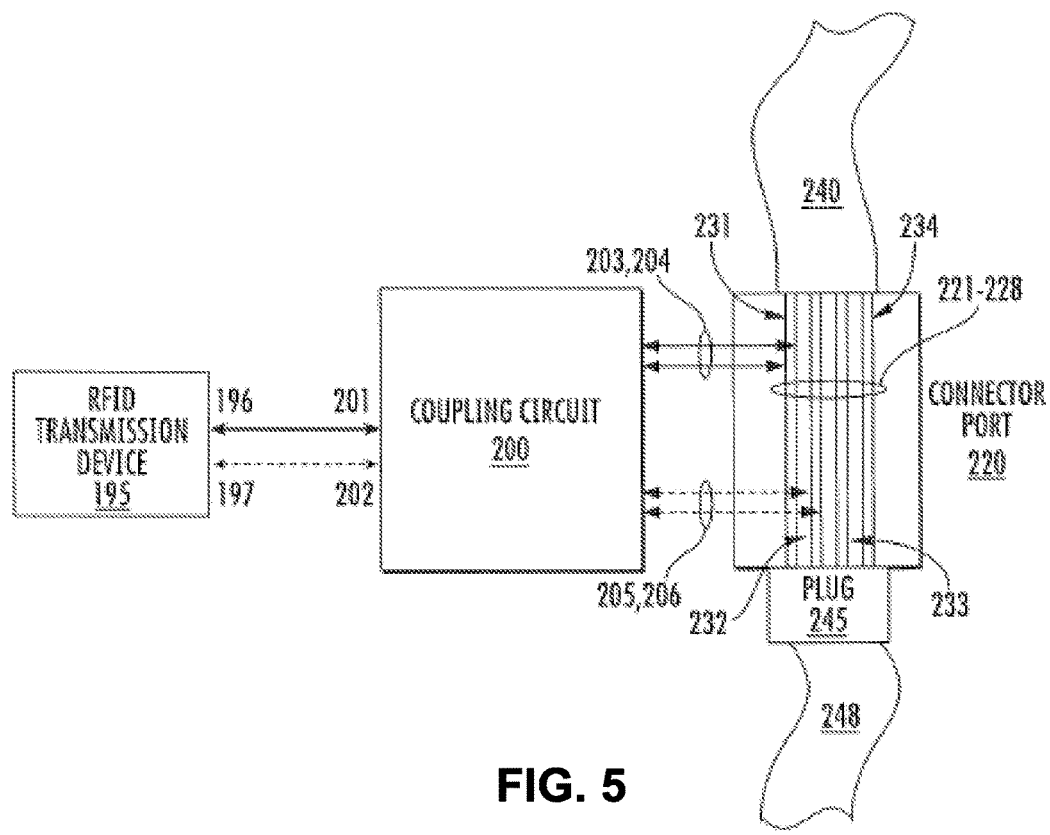
FIG. 5 is a schematic diagram illustrating how coupling circuits may be used to inject RFID control signals onto and/or extract the RFID control signals from various conductive paths of a connector port according to one aspect.
Figure 6:
FIG. 6 is a block diagram illustrating how baluns and matching networks may be used to provide appropriate connections between the RFID transmission device and the coupling circuit of FIG. 5 according to one aspect
Figure 7:
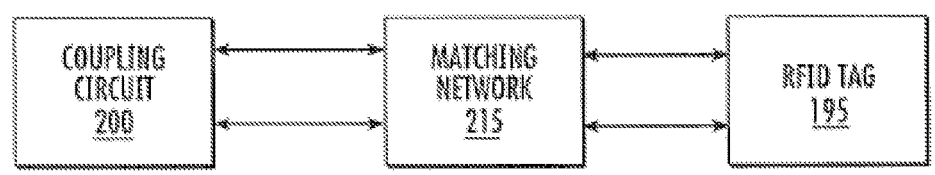
FIG. 7 is a block diagram illustrating how baluns and matching networks may be used to provide appropriate connections between the RFID transmission device and the coupling circuit of FIG. 5 according to one aspect.

As noted above, aspects of the present invention may use coupling circuits such as circuits 114-116 and 124-126 of FIG. 3 to couple the RFID control signals to and from a channel. FIGS. 5-12 provide additional details regarding the operation of example coupling circuits. For example, FIG. 5 is a schematic diagram illustrating how the coupling circuits according to aspects of the present invention may be used to inject and/or extract RFID control channels onto various conductive paths of a connector port. FIGS. 6-7 are block diagrams that illustrate how baluns and/or matching networks may be used to provide appropriate connections between RFID transmission devices (e.g., an RFID transceiver or an RFID tag) and the coupling circuits according to aspects of the present invention. Finally, FIGS. 8-12 illustrate several example coupling circuits that may be used to implement the coupling circuits 114-116 and 124-126 of FIG. 3.

Turning first to FIG. 5, this figure provides additional details as to how a coupling circuit 200 may be used to couple RFID control signals from an RFID transmission device 195 (e.g., an RFID transceiver or an RFID tag) to and from one or more of the differential pairs of a conductive paths that run through a connector port 220. As shown in FIG. 5, the connector port 220 includes a total of eight conductive paths 221-228 that are arranged as four differential pairs of conductive paths 231-234. These eight conductive paths 221-228 are electrically connected to respective ones of eight conductors of a communications cable 240 that is terminated into the back end of the connector port 220, and to the respective eight plug blades of a plug 245 that is inserted into the plug aperture of the connector port 220. The plug 245 is part of a patch cord 248 that extends between the connector port 220 and a connector port on another device (e.g., on another patch panel or on a network switch).

The RFID transmission device 195 may be configured to transmit and receive either single-ended or differential RFID control signals. If configured to transmit/receive single-ended RFID control signals, the RFID transmission device 195 will include a single output port 196, while if configured to transmit/receive differential RFID control signals, the RFID transmission device 195 will include a pair of output ports 196, 197. The coupling circuit 200 may have a single input port 201 (if the RFID transmission device 195 is a single-ended device) or a pair of input ports 201, 202 (if the RFID transmission device 195 outputs differential RFID control signals).

The coupling circuit 200 further includes a pair of output ports 203, 204. If the coupling circuit 200 is designed to operate on single-ended RFID control signals, the coupling circuit 200 is configured to pass a single-ended control signal that is received at input port 201 to both of the output ports 203, 204. If the coupling circuit 200 is designed to operate on differential RFID control signals, the coupling circuit 200 is configured to pass the first component of a differential RFID control signal (or some portion thereof) that is received at input port 201 to the output port 203, and to pass the second component of the differential RFID control signal (or some portion thereof) that is received at input port 202 to the output port 204. As shown in FIG. 5, the output ports 203, 204 of the coupling circuit 200 are coupled to the respective conductive paths 221, 222 of the first differential pair of conductive paths 231 that carry a differential signal through the connector port 220. Thus, as shown in FIG. 5, if the RFID transmission device outputs a single-ended RFID control signal, the coupling circuit 200 may be used to inject this RFID control signal as a common mode signal onto the conductive paths 221, 222 of the first differential pair of conductive paths 231 of connector port 220. If instead, the RFID transmission device outputs a differential RFID control signal, the coupling circuit 200 may be used to inject this differential RFID control signal as a differential signal onto the conductive paths 221, 222 of the first differential pair of conductive paths 231 of connector port 220. For cases where such differential RFID control signals are used, the differential RFID control signal can be transmitted at a frequency that falls outside of the frequency range of the underlying network traffic that may be carried on the first differential pair of conductive paths 231 and/or during time periods when no network traffic is present on the channel in order to avoid interference between the RFID control signal and the network traffic. Moreover, while operation of the coupling circuit is described above with respect to RFID control signals that are transmitted from the RFID transmission device 195 to the connector port 220, it will be appreciated that the coupling circuit 200 may be a bi-directional coupling circuit that likewise may be used to extract RFID control signals from the first differential pairs of conductive paths 231 and pass these RFID control signals to the RFID transmission device 195.

As is further shown in FIG. 5, in other aspects the coupling circuit 200 may also include a second pair of output ports 205, 206. This additional pair of output ports 205, 206 may be included if the coupling circuit is designed to operate on phantom mode signals. For example, if the RFID transmission device 195 outputs a differential RFID control signal, the first component of that signal (i.e., the component input to the coupling circuit at input port 201), or a portion thereof, may be passed by the coupling circuit 200 to output ports 203, 204 where it is injected as a common mode signal onto the conductive paths 221, 222 of the first differential pair of conductive paths 231 of connector port 220. Likewise, the second component of the differential RFID control signal (i.e., the component input to the coupling circuit at input port 202), or a portion thereof, may be passed by the coupling circuit 200 to output ports 205, 206 where it is injected as a common mode signal onto the conductive paths 223, 224 of the second differential pair of conductive paths 232 of connector port 220. As the differential RFID control signal is injected onto the differential pairs of conductive paths 231,232 as two common mode signals, the frequency of the RFID control signal may be within the frequency range of the underlying network traffic.

Most RFID transceivers are single-ended devices that output single-ended RFID interrogation signals, and that receive single-ended RFID control signals. As discussed above with respect to FIG. 5, the coupling circuit 200 may be designed to inject such single-ended RFID control signals as common mode signals onto one of the differential pairs of conductive paths of connector port 220. However, in order to reduce the impact of external noise sources on the RFID control signals that are used in aspects of the present invention, it may be desirable to use differential RFID control signals that are less susceptible to corruption from external noise sources. FIG. 6A illustrates an example circuit that may be used to convert a single-ended RFID control signal into a differential signal, and vice versa. For example, as shown in FIG. 6, the single-ended output of an RFID transceiver 195 may be input to a balun 210. As known to those of skill in the art, baluns may be used to convert a single-ended signals into differential signals and vice versa. Baluns or other appropriate circuits may also be provided at each connector port to convert single-ended responsive RFID signals that may be emitted by the RFID tags into differential responsive RFID signals, if desired. However, it may be preferable to instead implement the communications system using RFID tags that emit differential responsive RFID signals, in order to avoid the increased costs that may be associated with providing baluns or other suitable conversion circuits at each connector port in the communication system.

As will be discussed below with respect to FIGS. 8-12, in some aspects of the present invention, the coupling circuit 200 may directly connect RFID transmission device 195 (e.g., an RFID transceiver or an RFID tag) to a channel. In such aspects, this direct connection should be sufficiently matched in order to ensure that the RFID control signals are properly terminated. For example, if a device is connected at the end of the channel running through connector port 220 of FIG. 5 (e.g., a computer or other Ethernet device is coupled to the far end of patch cord 248), then any RFID control signal that is coupled onto the channel by coupling circuit 200 will experience a load of 100 ohms, as Ethernet devices are designed to have 100 ohm terminations to match the 100 ohm cabling. If, instead, no device is connected at the far end of the channel (i.e., the far end of patch cord 248 is not plugged into a device), then the RFID control signal will experience an open circuit. The coupling circuit 200 may be designed to exhibit a load of approximately 100 ohms so that if no device is connected at the end of the channel, the coupling circuit 200 will terminate the RFID control signal to a load of approximately 100 ohms. If a device is connected, the RFID control signal will be terminated with two 100 ohm terminations that are in parallel, which leads to a relatively small degree of mismatch for the RFID control signals. In cases where the RFID control signal is coupled into connector port 220 using phantom mode transmission techniques, the impedance could deviate from the 100 ohm impedance of the twisted pair transport media. The line matching needs to accommodate the specific matching to the cables impedance. In addition, the phantom mode control signals are expected to experience a termination that may be close to an open circuit, as the phantom mode should not be terminated by a regular RJ-45 connector nor by an end device different to a RFID tag or RFID transceiver.

It will also be appreciated that the RFID tags that are used in aspects of the present invention may or may not be designed to have an appropriate output impedance such as a 100 ohm impedance. Thus, as illustrated in FIG. 7, in some aspects a matching network 215 may be provided between each RFID tag 195 and its respective coupling circuit 200 in order to properly match the RFID tag to the coupling circuit so as to achieve acceptable return loss performance. In some aspects, a single-ended 50 ohm to differential 100 ohm balun may be used as the balun 210 of FIG. 6 in order to perform impedance matching. However, it will be appreciated that the balun 210 could have different impedance values.

As noted above, the coupling circuit 200 may couple the RFID control signals to and from the channel in a variety of different ways, including via resonant coupling, capacitive coupling and/or inductive coupling. FIGS. 8-12 illustrate example designs that may be used to implement the coupling circuit 200.

Figure 8:
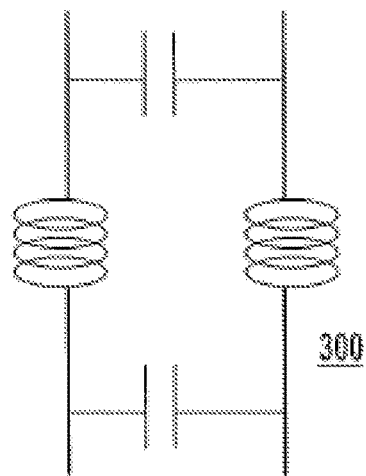
FIG. 8 is a schematic diagram of an example coupling circuit that may be used to implement the coupling circuit according to one aspect.
Figure 9:
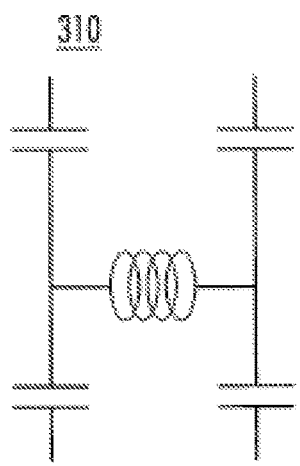
FIG. 9 is a schematic diagram of an example coupling circuit that may be used to implement the coupling circuit according to one aspect.
Figure 10:
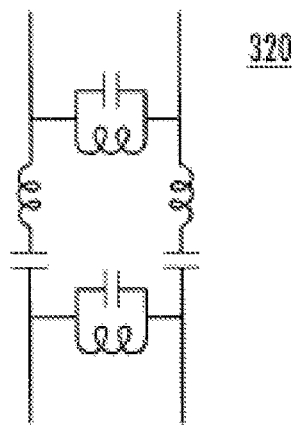
FIG. 10 is a schematic diagram of an example coupling circuit that may be used to implement the coupling circuit according to one aspect.

FIGS. 8-10 illustrate three example resonant coupling circuits. Each of these coupling circuits may be used to directly connect RFID transmission device 195 to one or more of the differential pairs of conductive paths 231-234 of connector port 220, as the resonant coupling circuit acts as a filter that only passes signals within a specified frequency range. One advantage of using resonant coupling techniques that allow for such a direct connection is that the coupling may involve only a relatively small attenuation of the RFID control signal. In contrast, for capacitive and/or inductive coupling techniques being used (as is discussed below with reference to FIGS. 11 and 12), the RFID control signal may be attenuated by 10 dB (or much more) each time it is coupled to or from the channel, as capacitive/inductive coupling may pass far less energy than a direct (resonant) electrical connection. For an RFID control signal that is coupled both to and from the channel, attenuations of two times the coupling loss plus two times the path loss on the channel may occur with a total loss that can exceed 20 dB (e.g., an attenuation of up to 100 dB might be anticipated) for capacitive and or inductive coupling circuits being used. With resonant coupling circuits, signal attenuation may be substantially less (such as, for example, 1 dB). Resonant coupling may allow for the use of reduced amplitude RFID control signals which may be less likely to interfere with differential Ethernet information signals that are being transmitted over the channel.

FIG. 8 illustrates a differential low pass coupling circuit 300 that may be used to pass, for example, signals that are in a frequency range that is below a certain cut-off frequency while blocking signals that are above this frequency. The differential low pass coupling circuit 300 may be used, for example, when the RFID control signals are transmitted at frequencies below 0.15 MHz. Appropriate inductor and capacitor values may be selected to set the cut-off frequency at an appropriate level. It will be appreciated that FIG. 8 illustrates one representative differential low pass coupling circuit design, and that any appropriate low pass filter circuit could be used.

FIG. 9 illustrates a differential high pass coupling circuit 310 that may be used to pass, for example, signals that are in a frequency range that is above a certain cut-off frequency while blocking signals that are below this frequency. The differential high pass coupling circuit 310 may be used, for example, when the RFID control signals are transmitted at frequencies above 400 MHz. Appropriate inductor and capacitor values may be selected to set the cut-off frequency at an appropriate level. It will be appreciated that FIG. 9 illustrates one representative differential high pass coupling circuit design, and that any appropriate high pass filter circuit could be used.

FIG. 10 illustrates a differential band pass coupling circuit 320 that may be used to pass, for example, signals that are within a specified frequency range, while blocking signals that are at frequencies either above or below the specified range. The differential band pass coupling circuit 320 can be used in place of the differential high pass coupling circuit 310. The differential band pass circuit 320 may provide improved performance over the differential high pass coupling circuit 310 as it allows less signal energy into the channel by filtering out, for example, high frequency harmonics. Appropriate inductor and capacitor values may be selected to set the upper and lower cut-off frequencies of—the differential band pass coupling circuit at appropriate levels to pass the RFID control signals. It will be appreciated that FIG. 10 illustrates one representative differential band pass coupling circuit design, and that any appropriate band pass filter circuit could be used.

Figure 11:
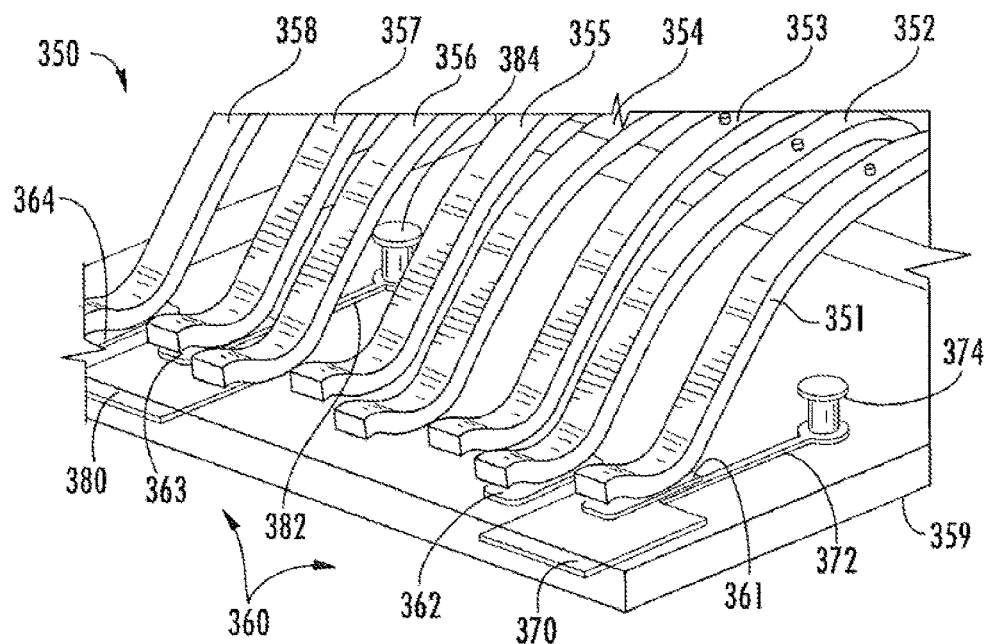
FIG. 11 is a schematic diagram of an example coupling circuit that may be used to implement the coupling circuit according to one aspect.

FIG. 11 illustrates an alternative example coupling circuit 360 that may be used to implement the coupling circuits 114-116 and 124-126 of FIG. 3. For example, FIG. 11 is a simplified and enlarged perspective view of a portion of a connector port 350 such as connector ports 111-113 and 121-123 of FIG. 3 that includes the coupling circuit 360. The coupling circuit 360 uses capacitive coupling to couple RFID control signals to and from two of the differential pairs of conductive paths that run through the connector port 350. The description below describes how the coupling circuit 360 may be used to couple differential RFID control signals to and from a channel of the connector port 350. Additional details regarding the design of the connector port 350 will be omitted here since such a description is provided in U.S. patent application Ser. No. 13/110,994, filed May 19, 2011, the entire content of which is incorporated herein by reference. The coupling circuit 360 is designed to inject (or extract) a phantom mode RFID control signal onto two of the differential pairs of conductive paths of the connector port 350.

As shown in FIG. 11, the connector port 350 includes eight spring contacts 351-358 which are configured to make physical and electrical contact with the blades of a mating plug which is received within the plug aperture (not shown) of the connector port 350. The contacts 351-358 are referred to as "spring" contacts because they are configured to resiliently deflect from a resting position when contacted by a mating plug, then spring back to the resting position when the plug is removed. As discussed above with respect to FIG. 1, these spring contacts 351-358 may be arranged as four differential pairs of contacts, with contacts 354-355 comprising the first differential pair, contacts 351-352 comprising the second differential pair, contacts 353, 356 comprising the third differential pair, and contacts 357-358 comprising the fourth differential pair. Each spring contact 351-358 may have a termination end (not shown) that terminates in a printed circuit board 359, and a distal end which resides above the printed circuit board 359. The free ends of the spring contacts 351-358 terminate near the forward edge of printed circuit board 359, and may be offset vertically from the top surface of printed circuit board 359 when the spring contacts 351-358 are in their normal resting position (i.e., in the position that they assume when not engaged by a mating plug). Each spring contact 351-358 is part of a respective one of eight conductive paths that are used to connect the eight conductors in a cable that is terminated into the back end of the connector port 350 to respective ones of the eight conductors of the patch cord that is plugged into the plug aperture of the connector port 350.

As shown in FIG. 11, a plurality of contact pads 361-364 are provided on the top surface of the printed circuit board 359. When the modular plug is inserted into plug aperture of the connector port 350, the distal ends of each of the spring contacts 351-352, 357-358 are deflected downwardly so as to come into mechanical and electrical contact with a respective one of the contact pads 361-364. The contact pads 361-364 are used to capacitively couple RFID control signals to and from pairs 2 and 4 of the connector port 350 (as discussed with respect to FIG. 1 above, pairs 2 and 4 are the outside pairs of contacts in the TIA/EIA 568 type B contact configuration), as will be discussed in further detail below.

As is further shown in FIG. 11, first and second plates 370, 380 are embedded in interior layers of the printed circuit board 359. The first plate 370 is positioned under the contact pads 361-362 that electrically connect to the conductors of pair 2, and the second plate 380 is positioned under the contact pads 363-364 that electrically connect to the conductors of pair 4. Plate 370 is electrically connected by a printed circuit board trace 372 to a conductive post 374, and plate 380 is electrically connected by a printed circuit board trace 382 to a conductive post 384. The conductive posts 374, 384 are electrically connected to respective first and second outputs of a differential RFID transmission device 195 (see FIG. 5).

The plate 370 and the contact pads 361 and 262 are separated by a layer of the printed circuit board 359. These components together form a pair of capacitors that may be used to capacitively couple a portion of an ID control signal to and/or from the respective first and second conductors of one of the four differential pairs of conductive paths that run through the connector port 350. For example, the plate 370 and the contact pad 361 form a first capacitor that is disposed between the RFID transmission device 195 (see FIG. 5) and the first conductive path through the connector port 350, and the plate 370 and the contact pad 362 together form a second capacitor that is disposed between the RFID transmission device 195 and the second conductive path through the connector port 350.

The plate 380 and the contact pads 363 and 364 are also separated by a layer of the printed circuit board 359. These components together form another pair of capacitors that may be used to capacitively couple a portion of a differential RFID control signal to and/or from the respective first and second conductors of a second of the differential pairs of conductive paths that run through the connector port 350. The plate 380 and the contact pad 363 can form a third capacitor that is disposed between the RFID transmission device the contact pad 364 together form a fourth capacitor that is disposed between the RFID transmission device 195 and the eighth conductive path through the connector port 350. Thus, the first pair of capacitors formed by elements 370, 361, 362 and the second pair of capacitors formed by elements 380, 363, 364, along with their corresponding electrical connections (e.g., traces 372, 382 and posts 374, 384) together form the capacitive coupling circuit 360 that may be used to couple differential RFID control signals between the RFID transmission device 195 and differential pairs 2 and 4 of the connector port 350. In the aspect of FIG. 11, the RFID control signals are coupled onto the channel as phantom mode signals, although it will be appreciated that in other aspects (not pictured), the coupling circuit could instead be designed, for example, to couple the RFID control signal onto a single differential pair of the channel as a common mode signal or as an out-of-band differential signal.

A differential RFID control signal may be coupled as a phantom mode signal onto the conductive paths of pairs 2 and 4 of connector port 350 from the RFID transmission device 195 as follows. A first component of the RFID control signal (e.g., the positive component) is passed from the RFID transmission device 195 to the conductive plate 370, and the second component of the RFID control signal (e.g., the negative component) is passed from the RFID transmission device 195 to the conductive plate 380. A portion of the first component of the RFID control signal is capacitively coupled from the conductive plate 370 through the dielectric substrate of printed circuit board 359 to the contact pads 361 and 362, and a portion of the second component of the RFID control signal is capacitively coupled from the conductive plate 380 through the dielectric substrate of printed circuit board 359 to the contact pads 363 and 364. When a plug is received within the plug aperture (not shown) of the connector port 350, the plug blades press the spring contacts 351-358 downwardly so that the distal ends of spring contacts 351, 352, 357, 358 make firm mechanical and electrical contact with their respective mating contact pads 361-364. When this occurs, the first component of the differential RFID control signal passes from the contact pad 361 to spring contact 351 and from the contact pad 362 to spring contact 352, thereby injecting the first component of the differential RFID control signal onto the conductive paths of pair 2 as a common mode signal. Likewise, the second component of the differential RFID control signal passes from the contact pad 363 to spring contact 357 and from the contact pad 364 to spring contact 358, thereby injecting the second component of the differential RFID control signal onto the conductive paths of pair 4 as a common mode control signal (e.g., a magnitude that is reduced by 70 dB) is transferred from plate 370 to the spring contacts of pair 2, and a reduced magnitude version of the second component of the RFID control signal (e.g., a magnitude that is reduced by 70 dB) is transferred from plate 380 to the spring contacts of pair 4.

Figure 12:
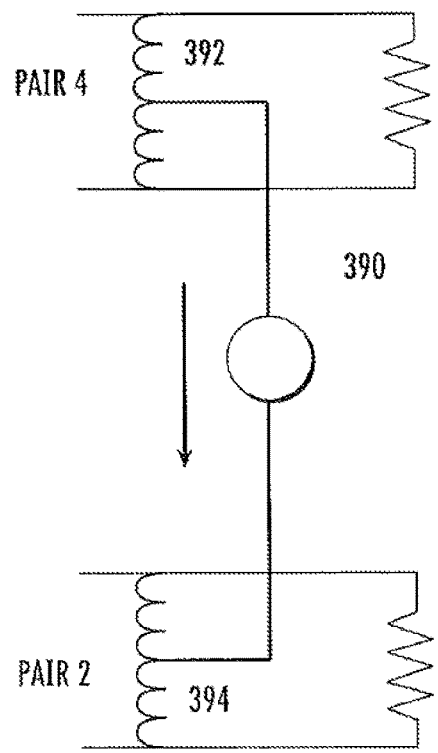
FIG. 12 is a schematic diagram of an example coupling circuit that may be used to implement the coupling circuit according to one aspect.

The coupling circuit 360 may likewise be used to extract phantom mode RFID control signals from pairs 2 and 4 of the conductive paths of connector port 350 and pass the extracted RFID control signal to the RFID transmission device 195. As the process is identical except that the direction of transmission of the RFID control signals is reversed, description of this reverse coupling process will be omitted. FIG. 12 is a block diagram of another alternative coupling circuit 390 that may be used to implement the coupling circuit 114-116 and 124-126 of FIG. 3. The coupling circuit 390 uses inductive coupling to couple differential RFID control signals to and from two of the differential pairs of conductive paths that run through a connector port (only two of the pairs of conductive paths of the connector port are shown in FIG. 12).

As shown in FIG. 12, a pair of center tapped inductors 392, 394 are provided. The two ends of the first of these inductors 392 are connected to the respective first and second conductive paths of a first of the differential pairs of conductive paths (pair 2) running through the connector port (the connector port is not shown in FIG. 12), and the two ends of the second of these inductors 394 are connected to the respective first and second conductive paths of a second of the differential pairs of conductive paths (pair 4) running through the connector port. A first component of the differential RFID control signal (i.e., the positive component) may be coupled to the first center tapped inductor 392, and a second component of the differential RFID control signal (i.e., the negative component) may be coupled to the second center tapped inductor 394. The first center tapped inductor 392 inductively couples the first component of the differential RFID control signal onto each conductive paths of pair 2, and the second center tapped inductor 394 inductively couples the second component of the differential RFID control signal onto each conductive path of pair 4. As with the circuits of FIG. 11, the differential RFID control signal is coupled onto the differential pairs of the connector port as a phantom mode signal that will generally not interfere with any differential signals that are carried on pairs 2 and 4. A similar inductive coupling circuit for coupling a phantom mode control signal onto two differential pairs of conductors is disclosed in U.S. Pat. No. 7,573,254 to Cobb et al., the entire contents of which is incorporated herein in its entirety.

Figure 13:
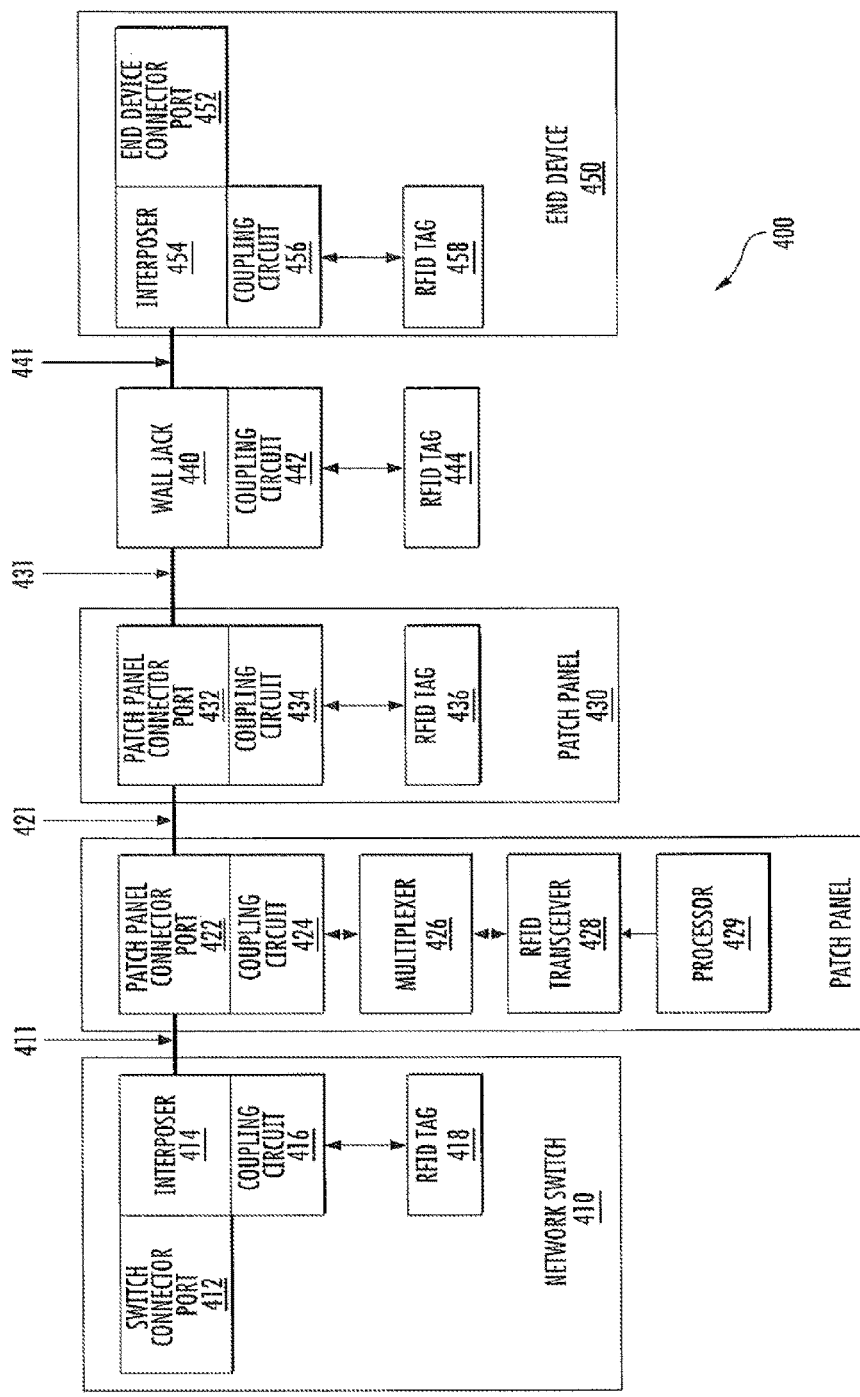
FIG. 13 is a schematic block diagram of a channel that illustrates how RFID control signals may be transmitted over Ethernet cabling for tracking cabling connections and end devices in a communications network according to one aspect.

FIG. 13 is a schematic block diagram that illustrates a channel 400 that runs between a first connector port 412 on a network switch 410 and a connector port 452 on a work area end device 450. In the particular example shown, this channel 400 extends through one patch panel connector port 422 on a first patch panel 420, a patch panel connector port 432 on a second patch panel 430 and a modular wall jack 440. It will be appreciated, however, that any number of connector ports may be included between the network switch connector port 412 and the end device connector port 452. For example, the channel 400 could additionally include one or more additional patch panel connector ports and or one or more consolidation point connector ports. Note that to simplify the drawings, only a single connector port is illustrated on the network switch 410 and the patch panels 420, 430.

As shown in FIG. 13, the patch panel 420 includes a processor 429, an RFID transceiver 428 and a multiplexer 426. Operations may begin with the processor 429 sending a control signal to the RFID transceiver 428. In response to the control signal, the RFID transceiver 428 may generate and transmit an RFID interrogation signal that is passed to the multiplexer 426. The processor 429 also sends a control signal to the multiplexer 426 that controls the multiplexer 426 to route the RFID interrogation signal to a coupling circuit 424 that is associated with a selected connector port (port 422) on patch panel 420. Example coupling circuit designs are discussed above with respect to FIGS. 8-12. The coupling circuit 424 couples the RFID interrogation signal onto at least some of the conductive paths of the connector port 422.

The RFID interrogation signal that is injected onto the conductive paths of connector port 422 passes to the conductors of a patch cord 421 that extends between connector port 422 on patch panel 420 and connector port 432 on patch panel 430. As shown in FIG. 13, the connector port 432 on patch panel 430 has an associated coupling circuit 434 and an associated RFID tag 436 (as will every other connector port on patch panel 430). The RFID tag 436 has a memory that may include, for example, a unique identifier and location information for its associated connector port 432. In some aspects, the unique identifier could be the serial number or MAC ID of the first patch panel 430 combined with a port number that identifies the connector port 432. A portion of the RFID interrogation signal is coupled from the connector port 432 by the coupling circuit 434 and passed to the RFID tag 436.

The portion of the RFID interrogation signal that is passed to the RFID tag 436 energizes the RFID tag 436. When energized, the RFID tag 436 emits a responsive RFID signal that includes, for example, some or all of the information stored in the RFID tag memory, specifically including the unique identifier. The differential responsive RFID signal is passed to the coupling circuit 434 where it is injected onto one or more of the differential pairs of connector port 432. The responsive RFID signal is then passed over the patch cord 421 back to connector port 422 of patch panel 420. At the connector port 422, the responsive RFID signal is passed from the one or more differential pairs of connector port 422 to the coupling circuit 424, where it is passed to the RFID transceiver 428 via the multiplexer 426. The RFID transceiver 428 receives the responsive RFID signal and extracts the unique identifier and any other data that is included in the responsive RFID signal. This unique identifier is passed to the processor 429, thereby notifying the processor 429 that a patching connection exists between connector port 422 and connector port 432. The processor 429 may provide this information to, for example, a rack manager (e.g., rack manager 36 of FIG. 2), a system manager (not shown) and/or other processing devices that create and/or maintain a log of the patch cord and cabling connections in the communications patching system.

Once the RFID interrogation signal is injected into the channel 400 that runs through the connector port 422, the RFID interrogation signal will pass along the entire length of the channel 400. Consequently, the RFID interrogation signal will also pass through the patch panel connector port 432 and over the horizontal cable 431 to the wall jack 440, and will then pass over the patch cord 441 to the interposer 454 that is mounted on the end device connector port 452. Likewise, the RFID interrogation signal will pass in the other direction over the patch cord 411 that connects patch panel connector port 422 to the interposer 414 mounted in the switch connector port 412. The interposers 414 and 454 are special connectors that each converts a standard connector port into a connector port that works in conjunction with one of the coupling circuits according to aspects of the present invention. The design and operation of an example interposer is discussed below with reference to FIGS. 14-15.

Focusing first on the RFID interrogation signal that travels over horizontal cable 431, this signal will enter the wall jack 440 where a portion of it is coupled from the channel by the coupling circuit 442. The coupling circuit 442 is electrically connected to an RFID tag 444 that has memory that may include, for example, a unique identifier and location information for the wall jack 440. The portion of the RFID interrogation signal that is passed to the RFID tag 444 energizes the RFID tag 444 so that it emits a responsive RFID signal that includes, for example, some or all of the information stored in the RFID tag memory, specifically including the unique identifier. The responsive RFID signal is passed back to the coupling circuit 442 where it is injected onto one or more of the differential pairs of conductive paths running through the wall jack 440. The responsive RFID signal will pass over the horizontal cable 431 and the patch cord 421 back to the connector port 422 on patch panel 420. At the connector port 422, the responsive RFID signal is passed from the differential pair(s) of conductive paths of connector port 422 to the coupling circuit 424, where it is passed to the RFID transceiver 428 via the multiplexer 426. The RFID transceiver 428 receives the responsive RFID signal and extracts the unique identifier for wall jack 440 therefrom. This unique identifier is passed to the processor 429, thereby notifying the processor 429 that connector port 422 is also connected to the wall jack 440. The processor 429 may provide this information to, for example, a rack manager (e.g., rack manager 36 of FIG. 2), a system manager (not shown) and/or other processing devices that create and/or maintain a log of the patch cord and cabling connections in the communications patching system.

The RFID interrogation signal will also travel over patch cord 441 to the interposer 454 that is inserted into the end device connector port 452, and will likewise travel from connector port 422 on patch panel 420 over the cable 411 to the interposer 414 that is inserted into the switch connector port 412. The RFID interrogation signal will be coupled from the coupling circuits 456 and 416 to the RFID tags 458 and 418, respectively, which will in turn each generate a responsive RFID signal that is injected back into the channel and received by the RFID transceiver 428. The manner in which the interposers 414 and 454 may be used to inject and extract RFID control signals to and from a channel will be described in detail below with reference to FIGS. 14-15.

Note that in the above-described aspect, a single RFID interrogation signal can energize multiple RFID tags at approximately the same time (e.g., RFID tags 436, 444, 418 and 458 in the example of FIG. 13). If multiple RFID tags are transmitting at the same time, the transmitted signals may interfere with each other, making it difficult or impossible to read the unique identifier associated with each RFID tag. Accordingly, arbitration techniques may be used to cause the RFID tags that are on any given channel to sequentially transmit to avoid such interference.

In some aspects, the above-described arbitration capability may be provided by using specialized RFID tags that support an arbitration procedure. The arbitration procedure can, for example, provide a method ensuring that only one RFID tag that is coupled to a particular channel transmits information at a time and/or provide a way of obtaining the unique identification codes even when multiple RFID tags transmit information simultaneously. In some aspects, RFID tags may be used that are designed to automatically perform an arbitration procedure when multiple RFID tags are excited at the same time by an RFID transceiver. If such RFID tags are used, the RFID transceiver may issue a command that takes the RFID tags out of transponder talk first mode. The RFID transceiver then issues a command that causes each RFID tag to transmit its unique identification code at a well-defined rate, such that each RFID tag transmits each bit of its identification code at the same time that the other RFID tags are transmitting the corresponding bit of their identification codes. At some point, the identification bits being transmitted by the multiple RFID tags will not all match. This will be recognized by the RFID transceiver as a "collision," and the RFID transceiver will then transmit an instruction telling only the RFID tags that were transmitting, for example, a "1" when the collision occurred to continue sending the remainder of their identification bits. Each time a subsequent collision occurs, the RFID transceiver transmits another instruction that commands only the RFID tags that were transmitting, for example, a "1" to continue transmitting. This process continues until only a single RFID tag is transmitting and that tag has transmitted its full unique identification code. The RFID transceiver then returns to a previous branch point (i.e., a point where an instruction was transmitted) and takes a different path (i.e., if the previous instruction commanded only the RFID tags transmitting a "1" to continue transmitting, then the "different path" may be an instruction commanding only the RFID tags transmitting a "0" to continue transmitting) to obtain another unique identification code. This process continues until the RFID transceiver has a complete list of the unique identification codes of each excited RFID tag. It will be appreciated that various other techniques may be used to address the potential problem of multiple RFID tags transmitting responsive signals at the same time such as, for example, assigning each RFID tag a particular time slot in a time division multiple access communication scheme or the use of a frequency division multiple access scheme. Other procedures and techniques may also be used.

Thus, as described above with respect to FIG. 13, pursuant to aspects of the present invention, RFID control signals may be passed along network cabling in order to identify all of the patching connections on each channel in a communications system.

It may also be desirable to automatically track the identity of the end devices that are coupled to a particular channel. By way of example, if the end devices are automatically tracked, then it may be possible to have security measures in place that automatically disable network switch connector ports when an unauthorized device is connected to a channel. As another example, when end devices are automatically tracked, the communications system can be designed to automatically reconfigure virtual local area networks upon sensing the connection of an authorized end device in order to provision pre-defined services to the newly-connected end device.

End devices that can be connected to communications systems of the type described herein are manufactured by a large number of manufacturers. These manufacturers may not agree to include coupling circuits on the connector ports of these end devices that could be used to inject and extract RFID control signals from the channel and to further include RFID tags for their devices. As such, the connector ports on most if not all end devices may not allow discovery of information regarding the end device. To address this potential shortcoming, interposer communications connectors are provided that may be used on network switches and/or work area end devices to facilitate automatically tracking patching connections and/or automatically identifying end devices according to certain aspects of the present invention.

Figure 14:
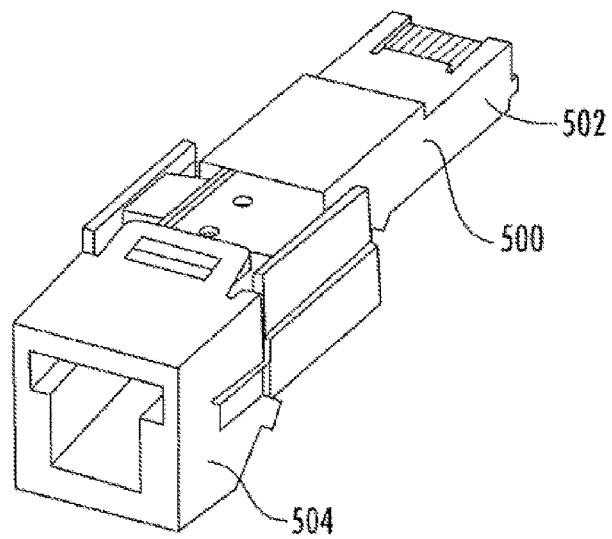
FIG. 14 is a schematic perspective view of an interposer according to one aspect.
Figure 15:
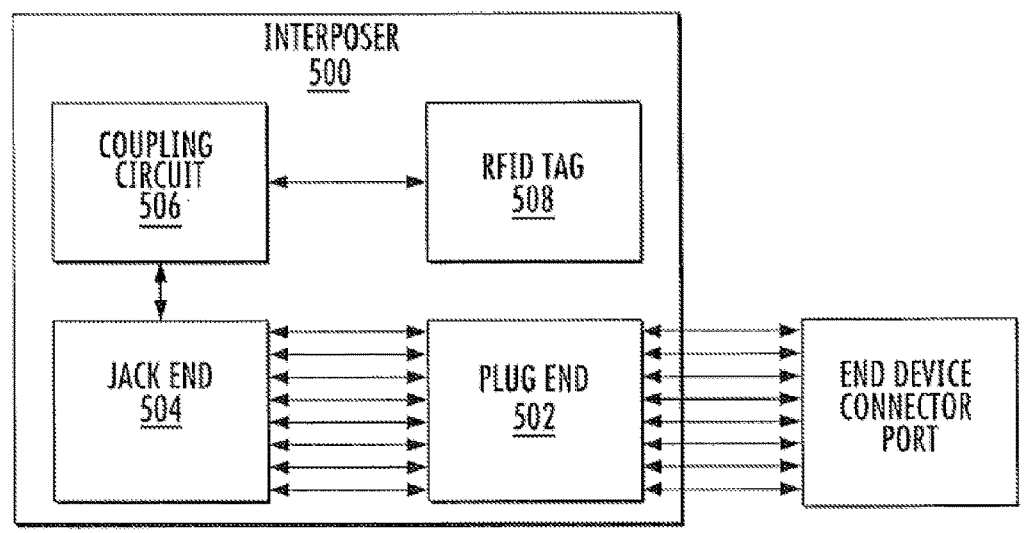
FIG. 15 is a block diagram of the components of the interposer of FIG. 14.

FIGS. 14-15 illustrate an example interposer 500 according to certain aspects of the present invention. For example, FIG. 14 is a schematic perspective view of an interposer 500, and FIG. 15 is a schematic block diagram that illustrates the functional components of the interposer 500.

Referring first to FIG. 14, it can be seen that the interposer 500 is a combination plug-jack connector that includes a plug end 502 that has a plug housing and eight plug blades, and a jack end 504 that is terminated with a communications jack (e.g., an RJ-45 jack). The plug end 502 of the interposer 500 may be plugged into a connector port (e.g., an RJ-45 jack) on an end device such as a network switch or a work area computer. The jack end 504 of the interposer 500 may be nearly identical to a conventional RJ-45 jack, except that instead of having wire connection terminals (e.g., IDCs) as output ports, the jack instead includes printed circuit board traces for each conductive path that connect to respective ones of the plug blades on the plug end 502 of the interposer 500. The plug end 502 of interposer 500 may be plugged into a connector port of an end device, and the jack end 504 of the interposer 500 may receive the plug on the patch cord that connects to the end device. As such, the interposer 500 can be inserted in series into the channel at the location of the end device.

Turning to FIG. 15, it can be seen that the interposer 500 additionally includes an embedded or associated coupling circuit 506 such as, for example, any of the coupling circuits described above with reference to FIGS. 7A-E, as well as an RFID tag 508 that is electrically connected to the coupling circuit 506. The coupling circuit 506 may be used to extract RFID interrogation signals from the channel and pass those RFID interrogation signals to the RFID tag 508. The RFID tag 508 may have a memory that stores a unique identifier (e.g., a MAC ID) for the end device. The coupling circuit 506 may likewise inject a responsive RFID signal that is transmitted by the RFID tag 508 onto the channel. The communications system may excite the RFID tags in the interposers 500 that are mounted on, for example, work area end devices or network switches in the same manner discussed above that the system can excite the RFID tags on remote patch panel connector polls and wall jacks in order to identify the end devices that are connected to each channel in the communications system. Thus, when interposers such as interposer 500 are used, the system manager can track end-to-end connectivity information for each channel.

Moreover, to prevent a particular interposer 500 from being removed from one end device and placed on another end device (which may result in misidentification of the end device), the plug portion of each interposer 500 may include a locking mechanism that a network administrator may use to lock the interposer 500 into a connector port on an end device. This locking mechanism may be designed such that it is difficult (or impossible) for someone without an unlocking key to remove the interposer 500 from an end device without damaging the interposer 500 and rendering it inoperable. For example, a locking mechanism such as the locking mechanism disclosed in U.S. Patent Application Publication No. 2010/0136809 may be used.

The interposer 500 preferably should be nearly invisible electrically so that the inclusion of the interposer 500 does not appear as another connection in the channel. This may be accomplished, for example, by designing different interposers 500 for use with different end devices, where the interposer 500 is specifically tuned to provide a high degree of crosstalk cancellation and low return losses when used in the connector port on the end device at issue.

Figure 16:
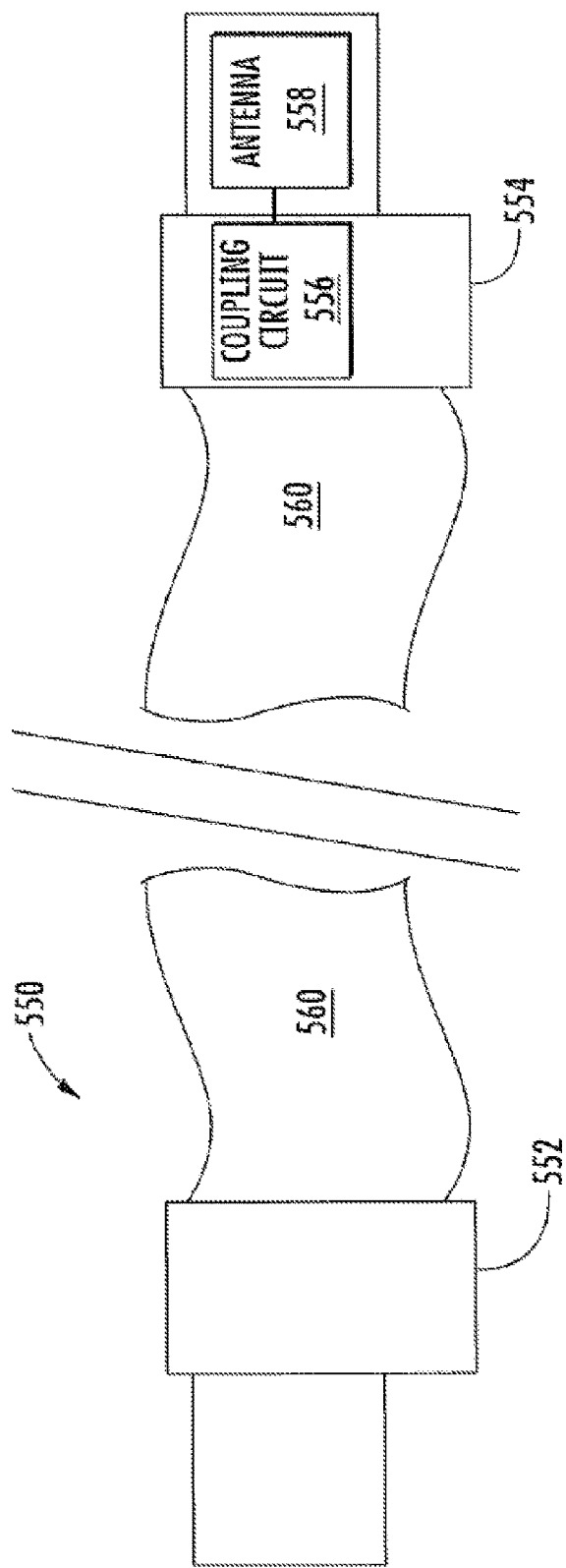
FIG. 16 is a schematic diagram that illustrates a patch cord according to one aspect.
Figure 17:
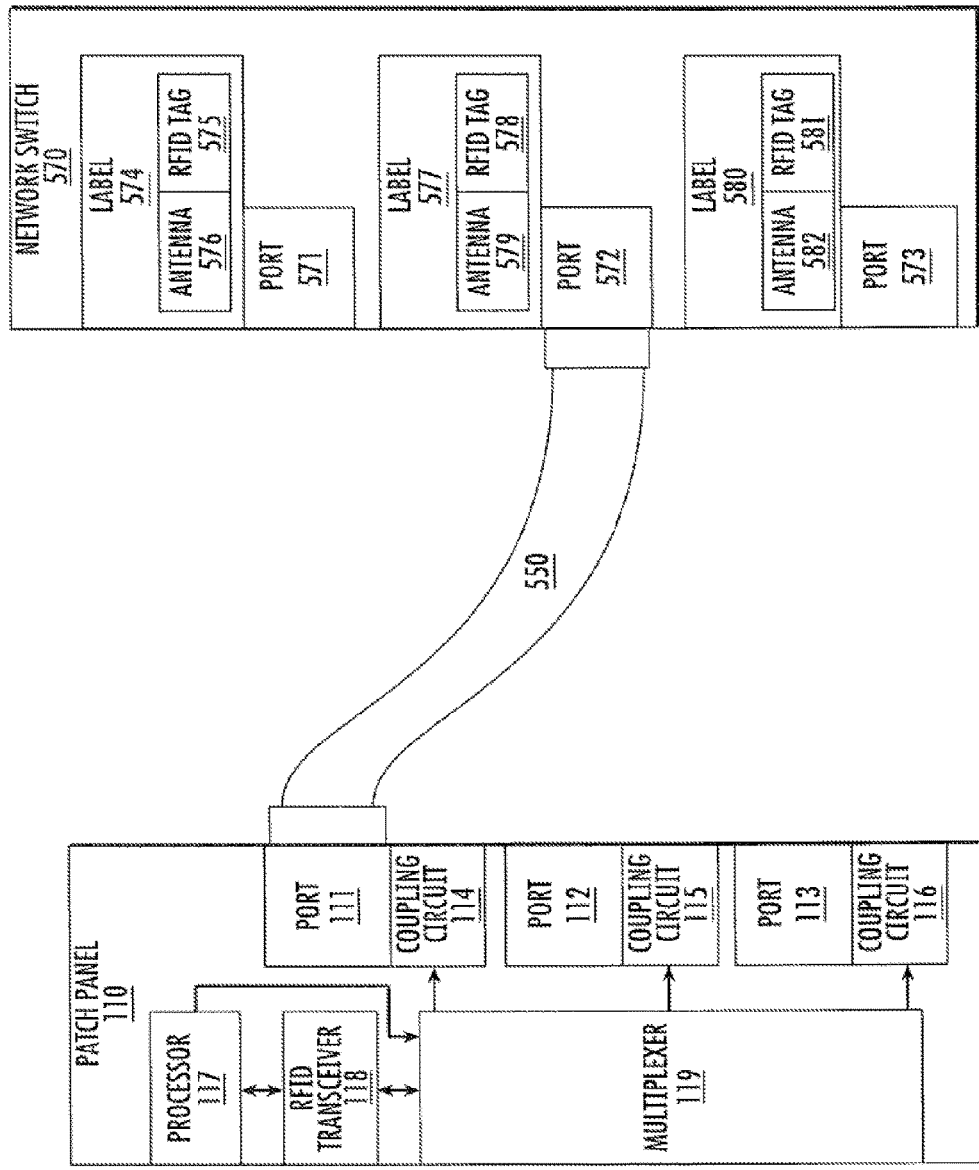
FIG. 17 is a block diagram that illustrates how the patch cord of FIG. 16 may be used to automatically track a patching connection in an inter-connect communications system.

Pursuant to still further aspects of the present invention, customized patch cords may be used instead of interposers to track patching connections to end devices that have standardized connector ports that do not include the coupling circuits or RFID tags that are used in aspects of the present invention. These customized patch cords may be used, for example, to track patching connections in inter-connect communications systems. FIG. 16 is a schematic diagram that illustrates one example design for such a customized patch cord. FIG. 17 is a block diagram that illustrates how the use of such customized patch cords may allow for automatically tracking patching connections in an inter-connect communications system without the use of interposers.

As shown in FIG. 16, the patch cord 550 includes a first plug 552, a second plug 554 and a cable 560 extending there between. The first plug 552 may be a standard RJ-45 communications plug, and the cable 560 may be a standard cable for an RJ-45 patch cord. The second plug 554 may also be identical to a standard RJ-45 communications plug, except that the second plug 554 further includes a coupling circuit 556 according to aspects of the present invention (e.g., any of the coupling circuits described above with reference to FIGS. 7A-7E) and an antenna 558 that is connected to the coupling circuit 556. Operation of this specialized patch cord will now be described with reference to the block diagram of FIG. 17.

As shown in FIG. 17, the patch cord 550 may be used in an inter-connect patching system to connect a first connector port 111 on a patch panel 110 to a connector port 572 on a network switch 570. The patch panel 110 is already described above with reference to FIG. 3, and hence further description thereof will be omitted. The network switch 570 may be a conventional network switch that includes a plurality of connector ports 571-573. Additionally, labels 574, 577, 580 are mounted (e.g., adhesively) adjacent to the respective connector ports 571-573 on the network switch 570. As shown in FIG. 17, each label 574, 577, 580 includes a respective RFID tag 575, 578, 581 and a respective RFID antenna 576, 579, 582. Each RFID tag 575, 578, 581 includes a unique identifier stored in a memory thereof that identifies the respective connector port 571-573 that the RFID tag 575, 578, 581 is associated with. Each RFID antenna 576, 579, 582 is connected to a respective one of the RFID tags 575,578, 581. The customized patch cords 550 (only one of which is shown in FIG. 17) and the labels 574, 577, 580 may be used to automatically track patching connections between patch panel 110 and network switch 570 as follows.

The RFID transceiver 118 on patch panel 110 transmits an RFID interrogation signal over the patch cord 550 in the exact same manner that an RFID interrogation signal is transmitted over patch cord 130 in the communications system of FIG. 3. However, in the inter-connect communications system of FIG. 17, the network switch 570 does not include a specialized connector port that has an associated coupling circuit to extract the RFID interrogation signal from the channel. Accordingly, in the inter-connect communications system of FIG. 17, the RFID interrogation signal is wirelessly transmitted using the antenna 558 on patch cord 550 to the RFID tags that are, for example, adhesively applied adjacent to each connector port 571-573 on the network switch 570 in order to allow automatic identification of the patching connections to the network switch 570.

For example, when the RFID interrogation signal reaches the second plug 554, a portion thereof is extracted from the channel by the coupling circuit 556, which feeds this RFID interrogation signal to the antenna 558. The antenna 558 transmits this RFID interrogation signal wirelessly to the RFID antenna 579 on the label 577 that is associated with connector port 572. The RFID antenna 579 passes this RFID interrogation signal to its associated RFID tag 578. The RFID tag 578 is excited by the received RFID interrogation signal and, in turn, emits a responsive RFID signal that includes a unique identifier that is stored in the memory tag 578. This responsive RFID signal is passed to the RFID antenna 579, which transmits the responsive RFID signal to the antenna 558 on patch cord 550. The responsive RFID signal is passed by the coupling circuit 556 onto the channel of patch cord 550, where it can then pass to the RFID transceiver 118 on patch panel 110 in the same manner described above with respect to FIG. 3 that responsive RFID signals are passed through patch cord 130 to RFID transceiver 118.

The antenna 558 and/or the RFID antennas 576, 579, 582 may be designed so that the signals that they transmit are transmitted directionally and/or for a very short distance, in order to ensure that only a single responsive RFID signal will be received by the antenna 558 in response to an RFID interrogation signal that is transmitted by antenna 558. Suitable RFID antenna designs that will achieve this are disclosed, for example, in the above-referenced U.S. patent application Ser. No. 11/871,448.

As noted above, signal attenuation increases with increasing frequency. Accordingly, when RFID control signals are used that are at frequencies above the Ethernet spectrum, signal attenuation may raise challenges, particularly in communications systems that have long cabling runs (e.g., cabling runs exceeding 100 meters) or communications systems that reactively (as opposed to resonantly) couple the RFID control signals to and from the channels of the communications system. Accordingly, in some aspects, the RFID control signals can inject higher magnitude RFID control signals, specifically including signals having magnitudes that exceed the magnitudes permitted for Ethernet signals under the above-referenced Category 5, 5E, 6 and 6a standards. These higher magnitude RFID control signals may be used because significant isolation may be provided between the RFID control signals and the underlying network traffic by frequency separation, time separation and/or by use of common mode or phantom mode signaling techniques.

Pursuant to further aspects of the present invention, the transmit power used for the RFID interrogation signals may be adjusted in order to reduce or minimize parasitic responses from RFID tags that are on channels other than the channel on which an RFID interrogation signal was transmitted. Such parasitic responses may arise because of unwanted coupling between channels that can occur when connector ports are located in very close proximity (which can be the case with patch panels, network switches, and some multi-socket modular wall jacks) and/or when patch cords or horizontal communications cables are bundled together. In some aspects, the power level of the RFID interrogation signals may be set to be sufficiently high such that the RFID interrogation signal can energize each RFID tag on its channel, and so that the responsive RFID signals from the RFID tags have sufficient magnitude to be detected by the RFID transceiver, yet preferably not be so high that the RFID interrogation signal gives rise to parasitic responsive RFID signals and/or interferes too much with underlying network traffic.

In some aspects, the magnitude of the RFID interrogation signals may be adaptively adjusted. In some aspects, the RFID transceiver may transmit a series of RFID interrogation signals having increasing magnitudes until a responsive RFID signal is received from an RFID tag associated with a particular connector port along the channel. The specific methodology used to adaptively adjust the power level of the RFID interrogation signal may depend on the configuration of the system (e.g., a different methodology may be used depending upon the number of RFID tags that may potentially be provided on a given channel). For purposes of illustration, the flow chart of FIG. 18 illustrates operations for adaptively adjusting the power level of an RFID interrogation signal that is used to track patching connections between patch panel ports (e.g., patching connections in a cross-connect patching system) according to certain aspects of the present invention.

Figure 18:
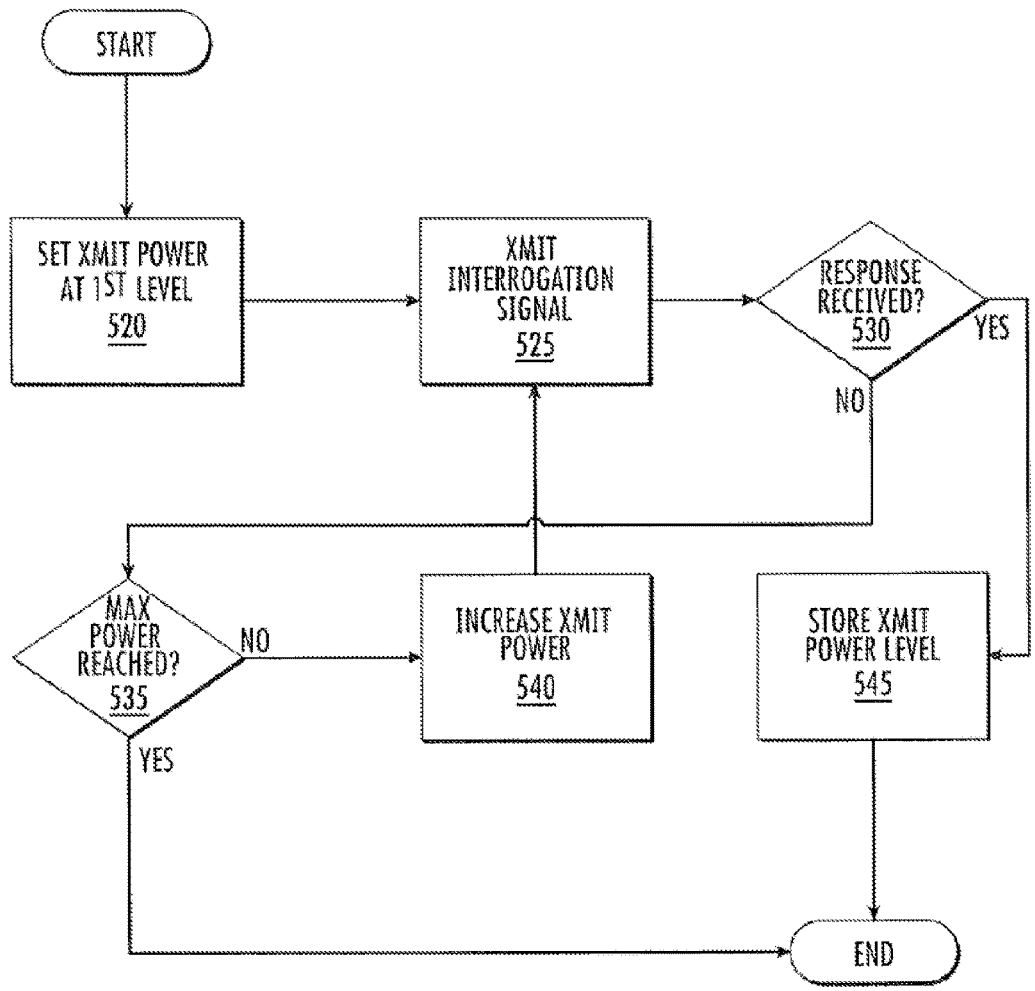
FIG. 18 is a flow chart that illustrates operations for adaptively adjusting the power level of an RFID interrogation signal according to one aspect.

As shown in FIG. 18, operations may begin with an RFID transceiver setting a transmit power for an RFID interrogation signal that is to be transmitted over a first channel at a first level (block 520). Then the RFID transceiver transmits an RFID interrogation signal at this power level over the channel (block 525). The RFID transceiver next determines whether or not a responsive RFID signal is received at the RFID transceiver from an RFID tag (block 530). If no responsive RFID signal is received within a predetermined time period, then a determination is made as to whether or not a maximum transmit power has been reached (block 535). If so, operations end. If the maximum transmit power has not been reached, then the RFID transceiver may increase the output power of the transmitter (block 540). Operations then return to block 525 where the RFID transceiver sends another RFID interrogation signal. Once at block 530 it is determined that a responsive RFID signal was received at the RFID transceiver from an RFID tag, then the power level of the RFID interrogation signal may be stored (block 545), and operations may end. This stored power level may then be used in subsequent operations (or, alternatively, a slightly higher power level to provide some margin). In this fashion, the RFID transceiver may ensure that sufficiently strong RFID interrogations signals are used while at the same time reducing the risk of parasitic responses and/or the impact of the RFID interrogation signals on the underlying Ethernet traffic by taking steps to cap the magnitude of the RFID interrogation signals once a sufficient signal magnitude is achieved.

Pursuant to further aspects of the present invention, RFID interrogation systems are provided that may make use of new variations of the Ethernet standard that define energy efficient Ethernet (IEEE 802.3az). In this new flavor of the IEEE 802.3 standard, the Ethernet transmitters are turned off when no data needs to be send, which will reduce the interference. In systems that transmit according to the IEEE 802.3az standard, the RFID transceivers according to aspects of the present invention may transmit control signals in the gaps between the regular network traffic, and hence may transmit at lower power levels and avoid interfering with the regular network traffic. Moreover, the RFID control signals could be transmitted using the spectrum that the regular network traffic usually occupies.

Figure 20:
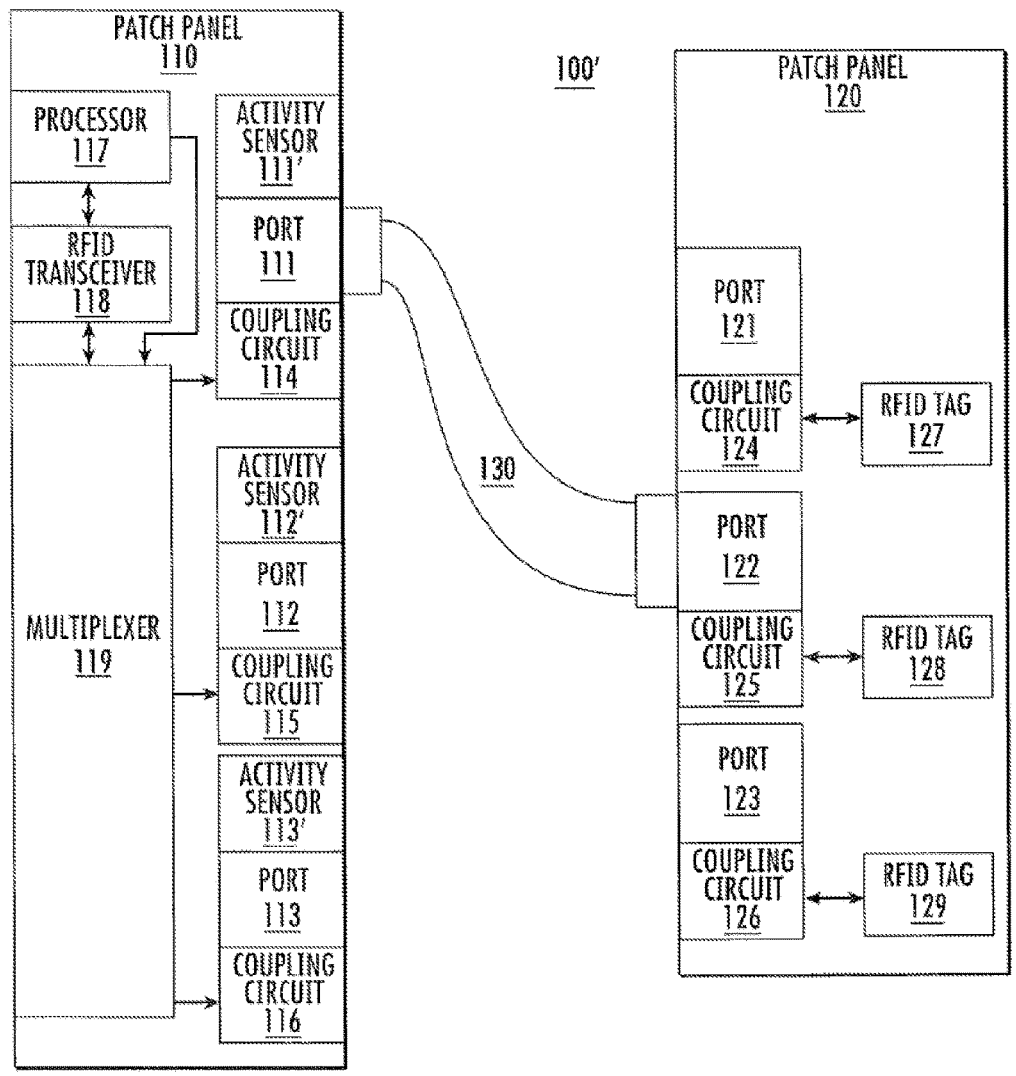
FIG. 20 is a block diagram of a patching connection between two patch panels of a communications system according to further aspects of the present invention.

FIG. 20 is a block diagram of a patching connection between two patch panels that illustrates yet another aspect of the present invention. As is readily apparent, the block diagram of FIG. 20 is identical to the block diagram of FIG. 3, except that the block diagram of FIG. 20 further includes Ethernet channel activity sensors 111', 112', and 113' that are provided on patch panel 110 to monitor whether or not regular network traffic is present on the channels that run through connector ports 111, 112, and 113, respectively. In the aspect illustrated in FIG. 20, the RFID transceiver 118 may monitor the activity on the channels running through connector ports 111, 112, and 113 and only transmit RFID control signals when no regular network traffic is sensed as being present on the channel that the RFID control signal is to be transmitted over. This technique avoids interference between the regular network traffic and the RFID control signals, and hence the RFID control signals may be transmitted at frequencies that are within the Ethernet spectrum. When an active Ethernet end device is connected to one of the channels, the RFID interrogation procedure will have already discovered most of the channel configuration. Thus, the RFID interrogation system may sense the newly added active Ethernet end device in the first moment when the device is connected to the Ethernet channel before Ethernet communications are established with the end device. In other words, the RFID detection may be designed to occur very quickly after the physical connection is established, but before the Ethernet channel is actively transmitting. The last detected RFID tag may be kept in the database and may be considered valid because any change to the physical connection may disrupt the Ethernet channel, which disruption may be sensed by the Ethernet channel activity sensors 111', 112', and 113' and used to trigger additional RFID interrogation. In this aspect, the RFID spectrum and the Ethernet spectrum could potentially be overlapping, as the Ethernet channel activity sensors 111', 112', and 113' may be used to avoid practical interference between the RFID interrogation systems and the regular network traffic. In such aspects, the RFID transceiver 118 could be configured to only perform RFID interrogations during time periods when there is no regular network traffic on the channel at issue.

Returning again to FIG. 18, it will be understood that the above-described operations that are illustrated in FIG. 18 may be carried out periodically for each channel in a communications system, and the system may store data regarding how the power level of the RFID interrogation signal that is necessary to receive a response from each RFID tag in the communications system changes over time. This data could periodically be analyzed to identify channels that require higher power levels over time, which may be an indication of degraded performance on cabling and/or connectors along the channel or increased interference from external noise sources (e.g., computer equipment, other cables, etc.). System administrators could then perform more detailed testing on channels that exhibit such degraded performance to determine the causes thereof.

As explained above, each RFID tag may be read from a remote location (e.g., from each patch panel). Additionally, the RFID tags may also be accessed locally. By way of example, a portable interrogation device may have a patch cord attached thereto that may be plugged into work area connector ports. The portable device may include an RFID transceiver that transmits an RFID interrogation signal onto the patch cord. The RFID interrogation signal is passed from the patch cord onto the channel in the manner described above where it excites the RFID tag in the work area connector port. The RFID tag generates a responsive RFID signal that is injected into the channel and then extracted from the channel at the connector port of the portable device (which may be a connector port according to aspects of the present invention).

In some aspects, such a portable interrogation device may also be used to program information into the RFID tags (e.g., at the remote connector ports) when a communications system is first installed. For example, the portable device may be connected to a tablet personal computer or other processing device. The tablet personal computer may be used to program information into the memory of the RFID tag such as, for example, location information specifying the location of the connector port at issue. Thus, once the connector ports in a building are installed, a technician can use the above-referenced portable device and tablet computer to program location information into each RFID tag.

Figure 19:
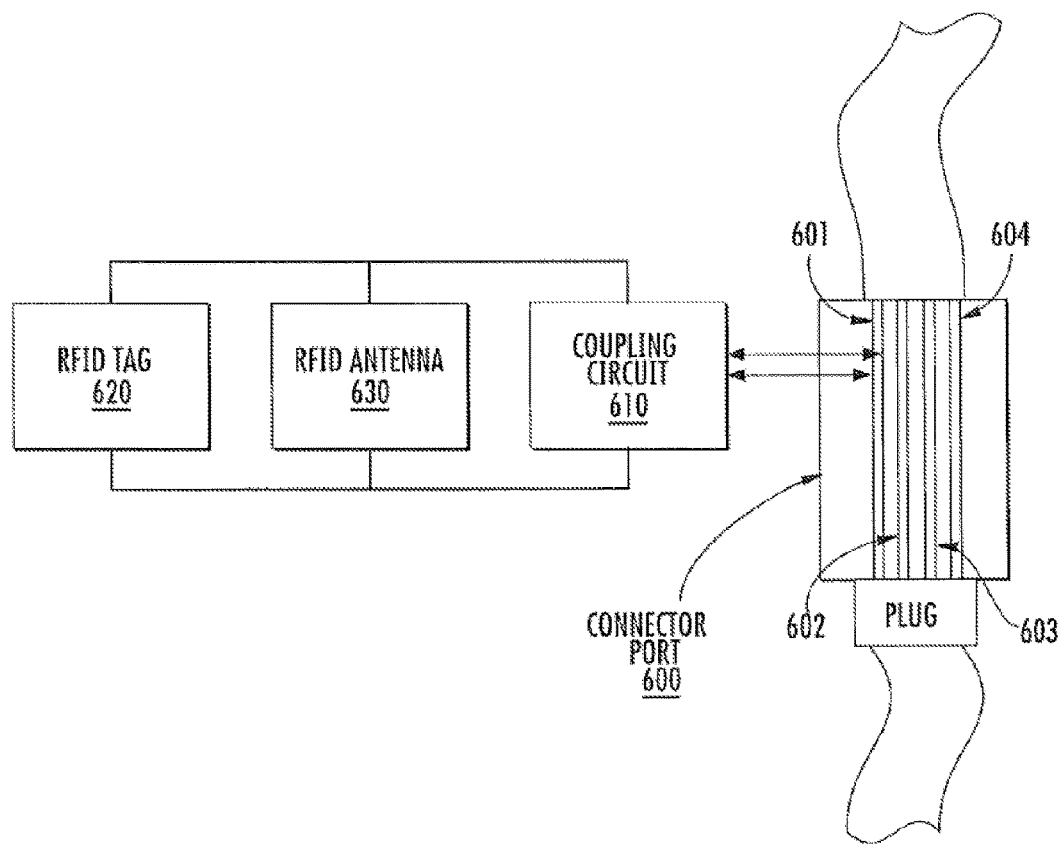
FIG. 19 is a schematic diagram illustrating a work area outlet according to further aspects of the present invention.

Pursuant to still further aspects of the present invention, work area outlets may optionally include an RFID antenna that is connected in parallel to the RFID tag. This RFID antenna may be used to wirelessly read information from, or write information to, the RFID tag. Hence, by providing the RFID antenna, a technician may wirelessly read information from, or program information into, each RFID tag, thereby avoiding the need to plug a patch cord of a portable device into each work area outlet. FIG. 19 is a schematic diagram illustrating a work area outlet 600 that includes such an RFID antenna. As shown in FIG. 19, the connector port 600 includes four differential pairs of conductors 601-604 that are part of the channel that runs through the connector port 600. A coupling circuit 610 is provided that may be used to inject and/or extract control signals to and/or from one or more of the differential pairs of conductors 601-604. The coupling circuit 610 is coupled to an RFID tag 620. An RFID antenna 630 is also provided. The RFID antenna 630 and the coupling circuit 610 are hard-wired in parallel to the RFID tag 620.

When connector ports are provided that have the design of work area outlet 600, portable devices (not shown) may be used that include an RFID transceiver and an antenna to wirelessly excite the RFID tag 620 that is associated with outlet 600. For example, the RFID transceiver of the portable device may transmit an RFID interrogation signal through an antenna of the portable device. This RFID interrogation signal may be received by the RFID antenna 630 that is hard-wired to the RFID tag 620, and the received RFID interrogation signal may be used to excite the RFID tag 620. Once excited, the RFID tag 620 generates a responsive RFID signal that is transmitted by the RFID antenna 630. This responsive RFID signal may be received by the antenna on the portable device and passed to the RFID transceiver thereof.

The portable device may likewise be used to place the RFID tag into a program mode in order to download information (e.g., a unique identifier, location information, etc.) into the memory of the RFID tag. By providing a wireless link it may be possible for technicians to more quickly program information into the memories of the RFID tags 620 mounted on the work area outlets 600.

In some aspects, each of the connector ports in the communications system may also include a plug insertion/removal detection circuit. Suitable circuits for detecting plug insertions and removals are known in the art including, for example, the circuits disclosed in U.S. patent application Ser. Nos. 12/787,486, 13/111,112 and 13/111,015, and in U.S. Pat. No. 6,424,710. The provision of these plug insertion/removal detection circuits allows the intelligent tracking system to operate as an event-driven system. For example, instead of performing periodic scans to determine all patching connections in a communications network, the system can monitor for plug insertions and/or removals and only transmit RFID interrogation signals after the detection of such plug insertions and removals to update the connectivity information. In some aspects, connectivity information could be tracked and updated using both event driven signaling and periodic scans that may be performed on a less frequent basis.

As discussed above, RFID tags may be provided for each connector port in the communications system. In some aspects, the RFID tags may be mounted in or on a housing of the connector port. In other aspects, the RFID tags may be mounted on an associated mounting structure such as a face plate for a modular wall jack or a mounting frame of a patch panel. In some aspects, the RFID tag may be mounted directly on a printed circuit board that includes some or all of the conductive paths of the connector port. Thus, it will be appreciated that the RFID tag may be mounted in any appropriate location.

In some aspects, the RFID control signals may be used to monitor for changes in the transmission line characteristics of the patch cords and/or horizontal cabling in a communications system. This is possible because the characteristics of the responsive RFID signals are known, and hence if changes in the transmission line such as increased temperature occur, this can be detected via detected changes in the characteristics of the received responsive RFID control signals.

Pursuant to still further aspects of the present invention, the RFID tags that are embedded in the connector ports of a communications system may be used to combat counterfeiting. In recent years, counterfeiting of connector ports, patch cords and horizontal cables has increased significantly. This counterfeiting may involve a third party manufacturer directly copying another manufacturer's products, specifically including the other manufacturers external look and feel, color scheme, product names, product numbers and the like so that the counterfeit product is indistinguishable from the genuine product when viewed by an end user. In some cases, the counterfeiter also directly copies the internal characteristics of the genuine product, while in other cases the counterfeiter uses different internal designs that almost always exhibit inferior performance. Such counterfeiting inevitably damages a manufacturer in the form of lost sales, and may also cause significant reputational damages (which results in additional lost sales) when the counterfeit products perform more poorly than the genuine products. The unique identifiers that are stored in the memory of the RFID tags according to aspects of the present invention may be used to combat counterfeiting as follows.

The unique identifiers can be stored in the RFID tags using a secret key encryption algorithm. The provider of the connector ports may maintain a list of the unique identifiers. Once a system is installed, the unique identifiers for all of the RFID tags may be collected by a system manager. This list may be provided to the manufacturer of the connector ports, who can then compare the list to production records to determine whether or not all of the unique identifiers match the unique identifier of a connector port that was manufactured by the manufacturer. The manufacturer may also keep track of where each connector port is installed, and thus if the same unique identifier is submitted multiple times the manufacturer will be able to identify that counterfeiting is incurring. The manufacturer can, for example, require that the list of unique identifiers be provided as a condition for issuance of a warranty certificate. The above techniques may be particularly effective in identifying distributors who purchase counterfeit products and mix them in with legitimate products.

As noted above, in addition to a unique identifier, other useful information may be programmed into the memory of each RFID tag. Such information may include location information that identifies the location of the connector port on which the RFID tag is mounted. In some aspects, this location information may be a floor number, a room number and a socket number. In other aspects, it may be the GPS coordinates of the connector port location (perhaps with a floor number as well, as GPS generally will not provide such information). Additional information such as, for example, a picture of the room and outlet, a drawing of the outlet position, date of manufacture information, etc. may also be stored in the memory of the RFID tag. This information may be stored in a write-protected mode and/or as encrypted information. This allows the system manager to read this information directly from each RFID tag, thereby eliminating the need to manually enter and/or import such information into the system manager.

According to still further aspects of the present invention, multiple RFID tags may be included in some or all of the work area outlets, where each RFID tag is designed to emit responsive RFID signals that are at different frequencies. For example, a first of the RFID tags may transmit responsive RFID signals at 150 kHz, and the second of the RFID tags may transmit responsive RFID signals at 433 MHz. The provision of multiple RFID tags per connector port may be used, for example, to monitor the frequency characteristics of the horizontal cables that are attached to the respective work area outlets. For example, low quality Ethernet cables tend to exhibit lower margins (or even negative margins) at higher frequencies. By measuring the signal-to-noise ratio of the responsive RFID signals that are received from the multiple RFID tags, it may be determined if lower quality cable is connected to specific connector ports. Additionally, if the attenuation is known as a function of temperature and frequency, the frequency-dependent attenuation of the responsive RFID signals that may be measured based on the responsive RFID signals received from the multiple RFID tags.

Aspects of the present invention may have a number of distinct advantages over prior intelligent patching approaches. For example, some aspects of the present invention may use conventional communications cables and patch cords that do not include extra conductors, identification chips, special contacts and the like. The inclusion of such extra elements as required by various prior art intelligent patching approaches can increase the cost of the cabling infrastructure, can prevent use of the already installed cabling and patch cord base, may increase the size, weight and cost of the cabling and has various other potential disadvantages. Some aspects of the present invention also may require only minimal changes to the connector ports in a communications system such as, for example, the provision of capacitors that are used to transfer the RFID control signals to and from the connectors and the provision of an RFID tag that may be implemented at relatively low cost. Moreover, the RFID protocol is well established and very robust, and hence has the potential to provide a highly reliable intelligent tracking system.

Moreover, while the provision of the RFID transceiver, processor and multiplexer may increase the cost of the systems according to aspects of the present invention, only a few of these components may be required as they may be shared across all of the channels that run through a patch panel, and hence the overall impact on the cost of the system may be manageable. Moreover, the intelligent tracking capabilities of the communications systems according to aspects of the present invention may extend to the work area in order to track patch cord and cabling connections to consolidation points and wall jacks, and interposers or other techniques may be used to perform tracking all the way to end devices in both the work area and the computer room to provide full end-to-end tracking. Such tracking of end devices may also enable a host of other capabilities such as, for example, automatic enablement of switch ports upon detection of the connection of an authorized device, the automatic deployment of services in response to detection of the connection of an authorized device, etc. Such capabilities may, for example, simplify network operation, result in power savings (by allowing unused switch ports to be set to a non-enabled state).

In additional or alternative embodiments, DAS can be used in confined areas to deploy wireless coverage and capacity to mobile devices. A DAS can include active components such as (but not limited to) master units, extension units, and remote antenna units. A DAS can also include passive components. Non-limiting examples of such passive components can include coaxial cables, RF splitters, RF combiners, RF antennas, optical fiber, optical splitters, optical combiners, connectors, jacks, wall jacks, patch cords, and the like.

Figure 21:
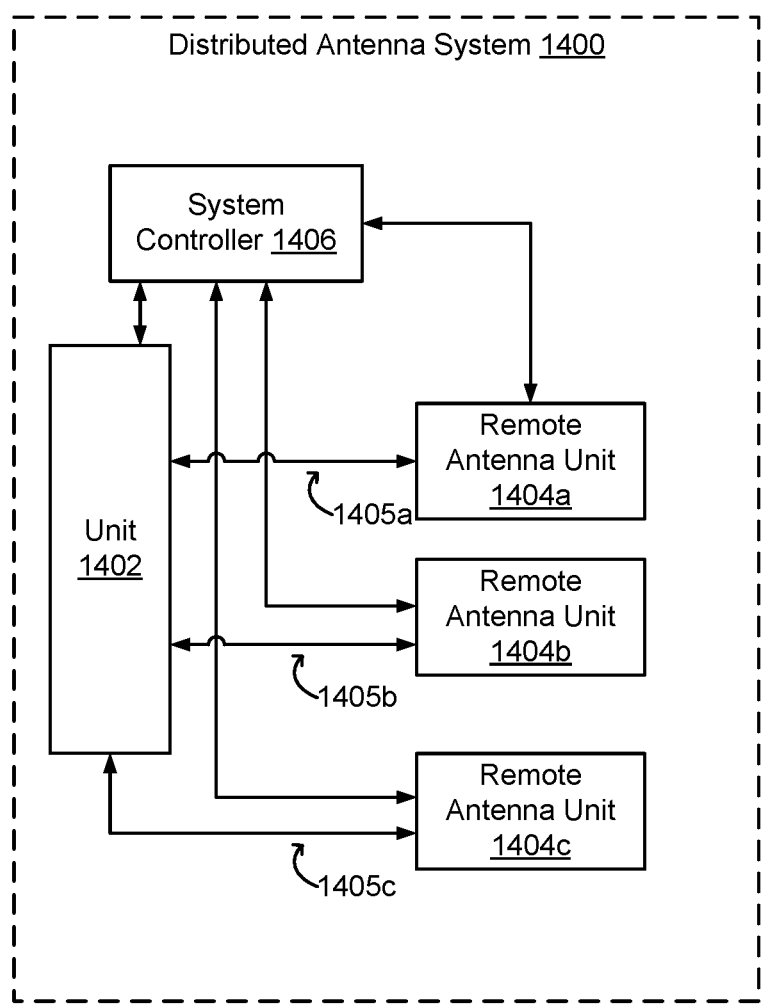
FIG. 21 is a block diagram of a distributed antenna system in which RFID detection of passive components may be used according to one aspect.

For example, FIG. 21 is a block diagram depicting a DAS 1400. The DAS 1400 can include a master unit 1402 as a donor device and remote antenna unit's 1404*a-c*.

The DAS 1400 can communicate with one or more base stations via a wired or wireless communication medium. The master unit 1402 can communicate uplink and downlink signals between the base stations and one or more remote antenna units 1404*a-c* distributed in the environment to provide coverage within a service area of the DAS 1400. The master unit 1402 can convert downlink signals received from the base stations, such as RF signals, into one or more digital data streams for transmission to the remote antenna units 1404*a-c*. The remote antenna units 1404*a-c* can convert digital data streams to RF signals. The remote antenna units 1404*a-c* can amplify the downlink signals and radiate the downlink signals to terminal equipment such as mobile communication devices.

A system controller 1406 can control the operation of the master unit 22 for processing the signals communicated with the remote antenna units 1404*a-c*. The signals communicated with the remote antenna units 1404*a-c* may be the uplink and downlink signals of the DAS 1400 for communicating with terminal equipment.

The master unit 1402 can provide downlink signals to the remote antenna units 1404*a-c* via the links 1405*a-c*. The links 1405*a-c* can include any communication medium suitable for communicating data via digitized signals between the master unit 1402 and the remote antenna units 1404*a-c*. The digitized signals may be communicated electrically or optically. Non-limiting examples of a suitable communication medium for the links 1405*a-c* can include copper wire (such as a coaxial cable), optical fiber, and microwave or optical communication link.

Although the DAS 1400 is depicted as including a single master unit 1402 and three remote antenna units 1404*a-c*, any number (including one) of each of master unit 1402 and remote antenna units 1404*a-c* can be used. Furthermore, a DAS 1400, according to some aspects, can be implemented without system controller 1406.

Figure 22:
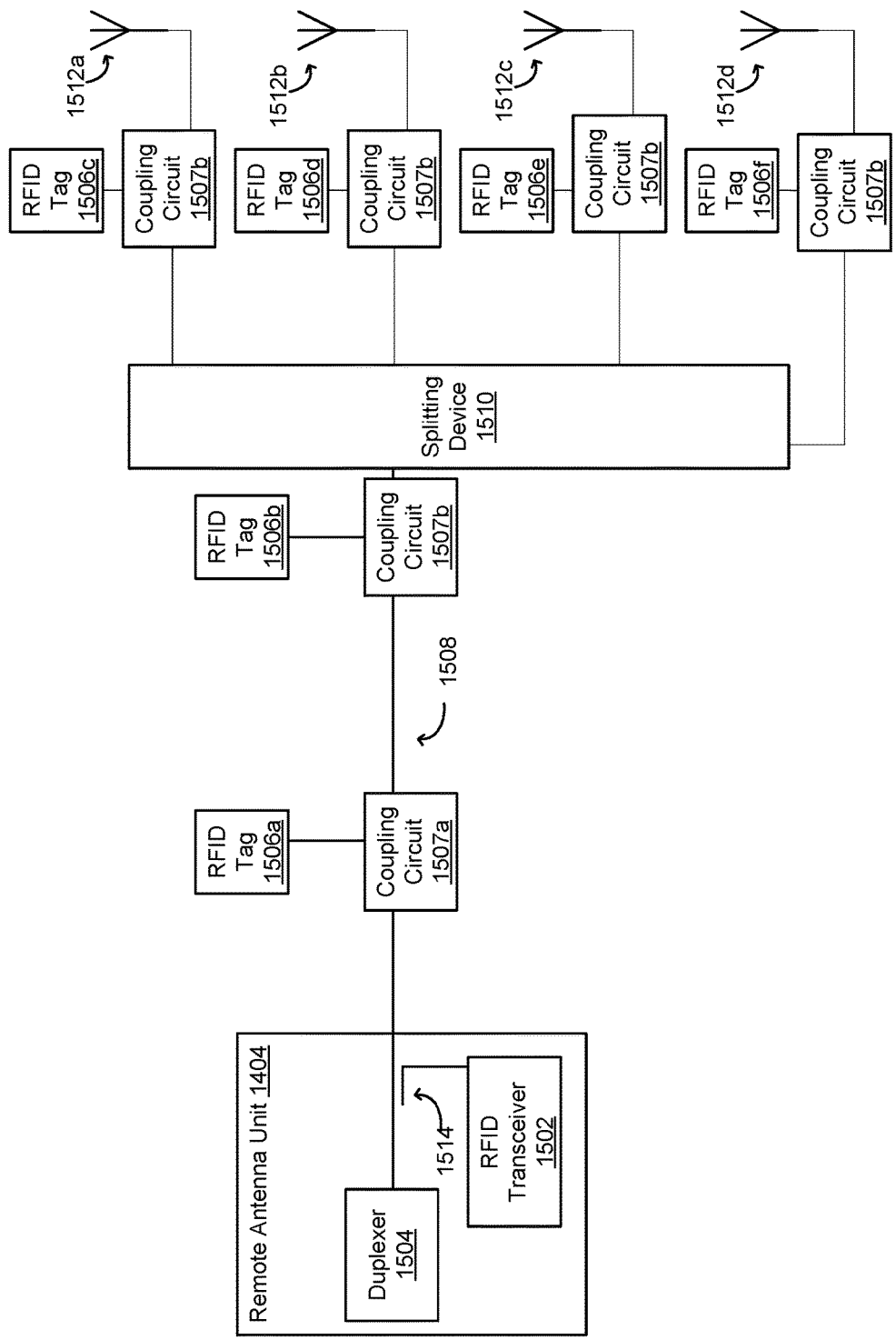
FIG. 22 is a block diagram of a remote antenna unit configured for performing RFID detection of passive components according to one aspect.

FIG. 22 is a block diagram of a remote antenna unit 1404 configured for performing RFID detection of passive components. The remote antenna unit 1404 can use of RFID tags 1506*a-f* to detect the presence of passive RF components. Each passive RF component has an associated RFID tag. For example, coaxial cable 1508 or other waveguide is associated with the RFID tag 1506*a*. The splitting device 1510 (such as an RF splitter) is associated with the RFID tag 1506*b*. The antennas 1512*a-c* are respectively associated with the RFID tags 1506*c-f*. Each of the RFID tags 1506*a-f* can be coupled to a respective passive component via the coupling circuits 1507*a-f* or other suitable coupling circuit or device.

Although four antennas 1512*a-d* are depicted, any number of antennas (including one) can be used.

Each of the RFID tags 1506*a-f* can include a unique, non-removable, and tamper-proof serial number. Each of the RFID tags 1506*a-f* can allow the a respective passive component to be identified by the system controller 1406 that is communication with an RFID transceiver 1502 or other reader/interrogator system in the remote antenna unit 1404. The interrogation process can be initiated by the system controller 1406. The system controller 1406 can send a command to the RFID transceiver 1502 to begin to probe for RFID tags 1506*a-f*.

In some aspects, the RFID transceiver 1502 can transmit the probing signal via telegram to a coupler 1514. The coupler 1514 can be a directional coupler (as depicted in FIG. 22) or a non-directional coupler. The coupler 1514 can have a coupling ratio of −10 dB or smaller with respect to the coaxial cable 1508 in direction to the RFID tagged elements. In other aspects, the RFID transceiver 1502 can transmit the probing signal via a low pass, band pass, or high pass filter can be used.

The probing signal can be communicated via the coaxial cable 1508. The probing signal can experience some loss due to the nature of the coaxial cable 1508 or other waveguide. One or more of the RFID tags 1506*a-f* can receive a probing signal that having a signal level above a predetermined threshold for the RFID tag. Non-limiting examples for such a threshold include signal levels between −15 dBm and −18 dBm. One or more of the RFID tags 1506*a-f* can receive the probing signal via a respective one of coupling circuits 1507*a-f*. One or more of the RFID tags 1506*a-f* can generate a responsive signal. The responsive signal can be communicated to the RFID transceiver 1502 via the coaxial cable 1508 or other waveguide.

Although FIG. 22 depicts a remote antenna unit 1404 having four antennas 1512*a-c*, other implementations are possible. A remote antenna unit 1404 can be coupled to any suitable number of antennas. In some aspects, the DAS 1400 may be configured as a low power DAS. A low power DAS may include remote antenna units having fewer antennas. For a DAS using a low RF power, the RFID transceiver 1502 can be included in each remote antenna unit and/or communicate with each remote antenna unit via a central system or devices, such as (but not limited to) the master unit 1402 and a network coupling the master unit 1402 to each remote antenna unit. Each splitting device 1510, coupler, and antenna of a respective remote antenna unit 1404 can be equipped with an RFID tag as depicted in the FIG. 23. The RFID transceiver 1502 can transmit probing signals and receive responsive signals from the RFID tags. The implementation and protocol of the RFID standard can be used to suppress collisions in the responses from RFID tags. An element discovery can show which element and associated RFID tag ID is connected to a given remote antenna unit. Periodic probing of the passive components can allow the detection of changes in the installation. Periodic probing of the passive components can additionally or alternatively be used to identify a faulty connection or broken cable in the absence of an expected RFID response.

In additional or alternative aspects, the DAS 1400 may be configured as a high power DAS. A high power DAS includes more antennas connected to a given remote antenna unit 1404 than a low power DAS. More antennas can be connected to a given remote antenna unit 1404 by increasing the amount of splitting performed by a splitting device 1510. The RFID signal link budget can be evaluated to avoid the RFID transceiver 1502 signal being reduced to an insufficiently high level by the splitting. An insufficiently high signal can be a signal level that is too low to excite one or more of the RFID tags 1506*a-f*, thereby resulting in no responsive signal being generated. An RFID implementation having a lower loss and a higher link budget may be used. Alternatively, multiple RFID tags 1506 operating on different frequencies can be installed in the passive components, thereby increasing the flexibility of the signal strength requirement for signals transmitted by an RFID transceiver 1502. For example, an RFID implementation operating at 100-150 kHz may be used with resonant coupling circuits 1507*a-f* that exhibit low pass characteristics. Other non-limiting examples of RFID implementation include RFID implementations operating at 13.56 MHz, 860-915 MHz, and potentially 2.4 GHz.

Figure 23:
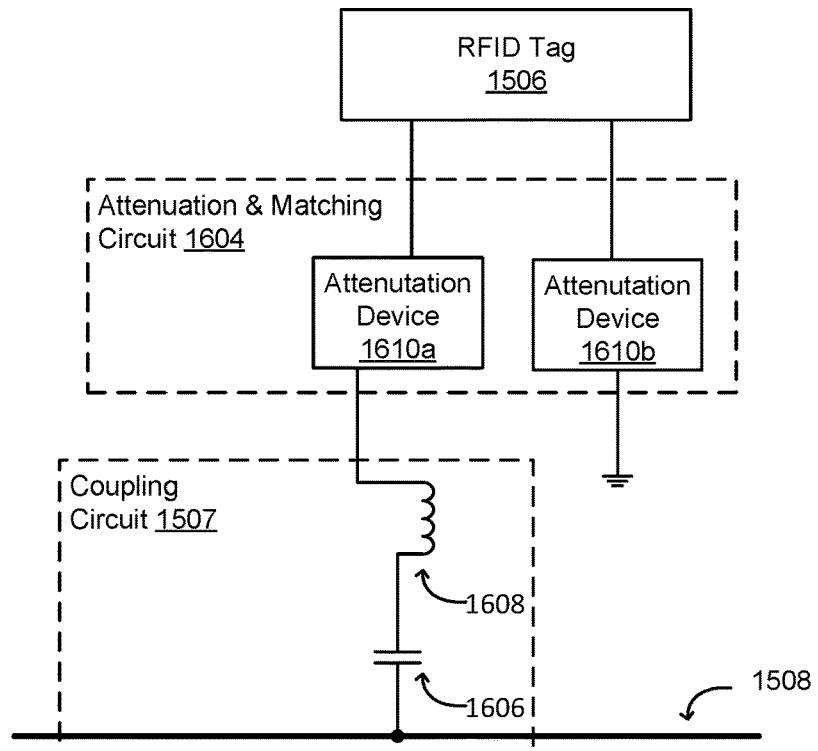
FIG. 23 is a block diagram of an RFID tag coupled to a passive component via a resonant coupling circuit according to one aspect.

FIG. 23 is a block diagram depicting an RFID tag 1506 coupled to a passive component, such as a coaxial cable 1508 or other waveguide, via a resonant coupling circuit 1507. The RFID tag 1506 can be communicatively coupled to the coaxial cable 1508 via an attenuation and matching circuit 1604 and the coupling circuit 1507.

The coupling circuit 1507 can couple an RF signal on the coaxial cable 1508 to an RFID tag 1506 via a capacitor 1606 and an inductor 1608. The coupling circuit 1507 can have a resonant characteristic provided by the capacitor 1606 and the inductor 1608. The resonance frequency can be the operational frequency of the RFID tag 1506. For frequencies separate from the resonance frequency, the coupling circuit 1507 can provide a high impedance to minimize negative impacts from signals used for mobile communication via the DAS 1400. Non-limiting examples of negative impacts from signals used for mobile communication can include reflection and loss to other signals on different frequencies.

The attenuation and matching circuit 1604 can include attenuation devices 1610*a*, 1610*b*. The RFID tag 1504 can be communicatively coupled to the coupling circuit 1507 via the attenuation device 1610*a*. The RFID tag 1504 can be communicatively coupled to ground via the attenuation device 1610*b*.

Although the FIG. 23 depicts an attenuation and matching circuit 1604 for coupling the RFID tag 1506 to a coupling circuit 1507, other implementations are possible. In other aspects, a balun component, such as (but not limited to) a transformer, can be used in place of the attenuation devices 1610*a*, 1610*b*.

Figure 24:
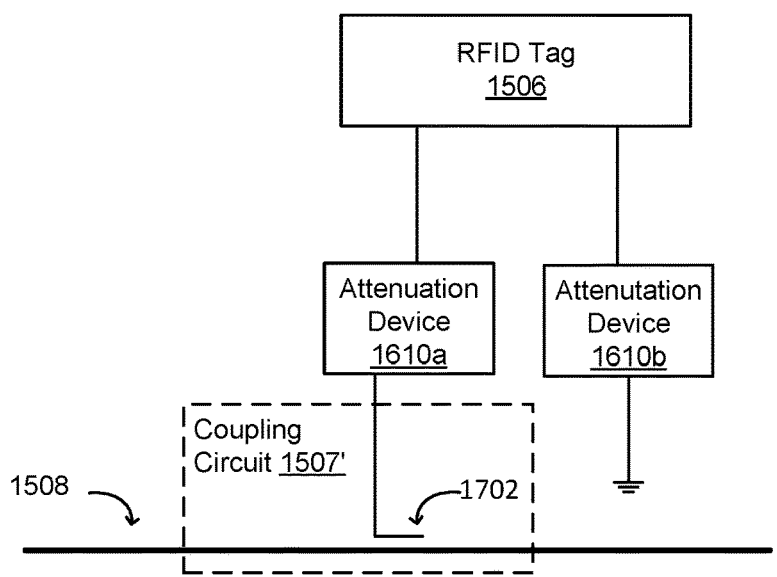
FIG. 24 is a block diagram of an RFID tag coupled to a passive component via a directional coupler according to one aspect.

In additional or alternative aspects, the RFID tag 1506 can be coupled to the coaxial cable 1508 or another passive component via a non-resonant coupling circuit. For example, FIG. 24 is a block diagram of an RFID tag 1506 coupled to a passive component, such as the coaxial cable 1508, via a directional coupler 1702 1702. The directional coupler 1702 can be used with a coupling optimized for signals communicated with the RFID transceiver 1502 and selected for suppressing potential intermodulation products generated by the RFID tag 1506 in the direction of one or more antennas.

In some aspects, the functionality of the passive component can be independent of the direction or other orientation of a passive component as mounted or otherwise installed in a DAS 1400. In other aspects, the functionality of the passive component can be dependent on the direction or other orientation of the passive component as mounted or otherwise installed in the DAS 1400. The directional coupler 1702 can allow for determining whether a passive component is mounted in the correct direction. A bias-t element is a non-limiting example of an element having functionality dependent on the direction or other orientation of the passive component as mounted or otherwise installed.

Figure 25:
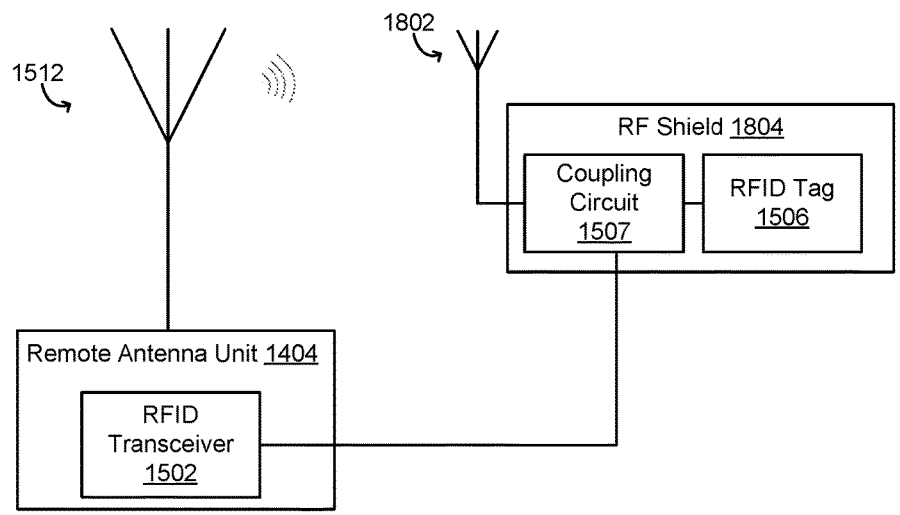
FIG. 25 is a block diagram of an RFID tag coupled to an antenna via an air coupling path according to one aspect.

In additional or alternative aspects, an RFID tag 508 can be communicatively coupled to a passive RF component with a radiating element, such as an antenna or a leaky feeder. For example, FIG. 25 is a block diagram of an RFID tag coupled to an antenna 1512 via an air coupling path. The air coupling path can include a signal path between an antenna 1512 and an RFID antenna 1802.

The RFID tag 1506 can be communicatively coupled to the antenna 1512 using the RFID antenna 1802. The RFID antenna 1802 can be coupled to the RFID tag 1506 via the coupling circuit 1507. The coupling circuit 1507 can be resonant for an operational frequency of the RFID tag 1506. The coupling circuit 1507 can block or reduce the signal level of signals at frequencies other than the operational frequency of the RFID tag 1506. The filtering characteristic of the coupling circuit 1507 can cause signals other than the signal of the RFID transceiver 1502 to be suppressed. Suppressing signals other than the signal of the RFID transceiver 1502 can reduce or eliminate potential intermodulation products generated by the RFID tag 1506. Decreasing the distance between the RFID antenna 1802 and the antenna 1512 can maintain coupling of at a level of −20 dB or higher without significantly changing the radiation pattern of the antenna 1512.

Figure 26:
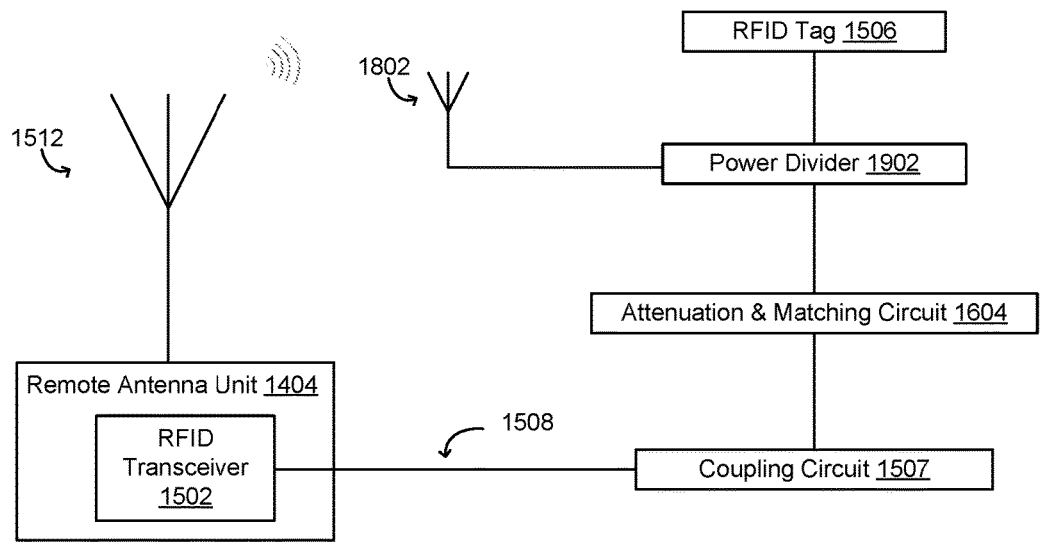
FIG. 26 is a block diagram of an RFID tag that is associated with multiple coupling circuits according to one aspect.

In additional or alternative aspects, a given RFID tag can be associated with multiple coupling circuits. For example, FIG. 26 is a block diagram of an RFID tag 1506 that is associated with multiple coupling circuits. The coupling circuits include a physical coupling circuit 1507 for coupling to a coaxial cable 1508 and an RFID antenna 1802 or other suitable air interface for coupling via air to an antenna 1512 or leaky loss section of a coaxial cable 1508. A power divider 1902 between the RFID tag 1506 and each of the coupling circuit 1507 and the RFID antenna 1802 can divide an RFID signal communicated with the RFID transceiver such that that the RFID signal can be transceived through either or both of the coupling circuit 1507 and the RFID antenna 1802.

The power divider 1902 depicted in FIG. 26 can allow for determining of an element associated with an RFID tag with a moveable reader.

Figure 27:
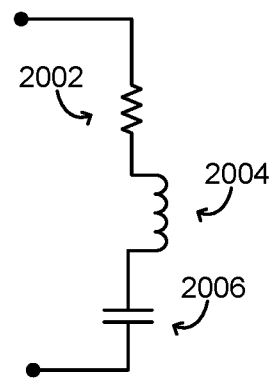
FIG. 27 is a schematic diagram of a series resonator circuit for a resonant coupling circuit according to one aspect.
Figure 28:
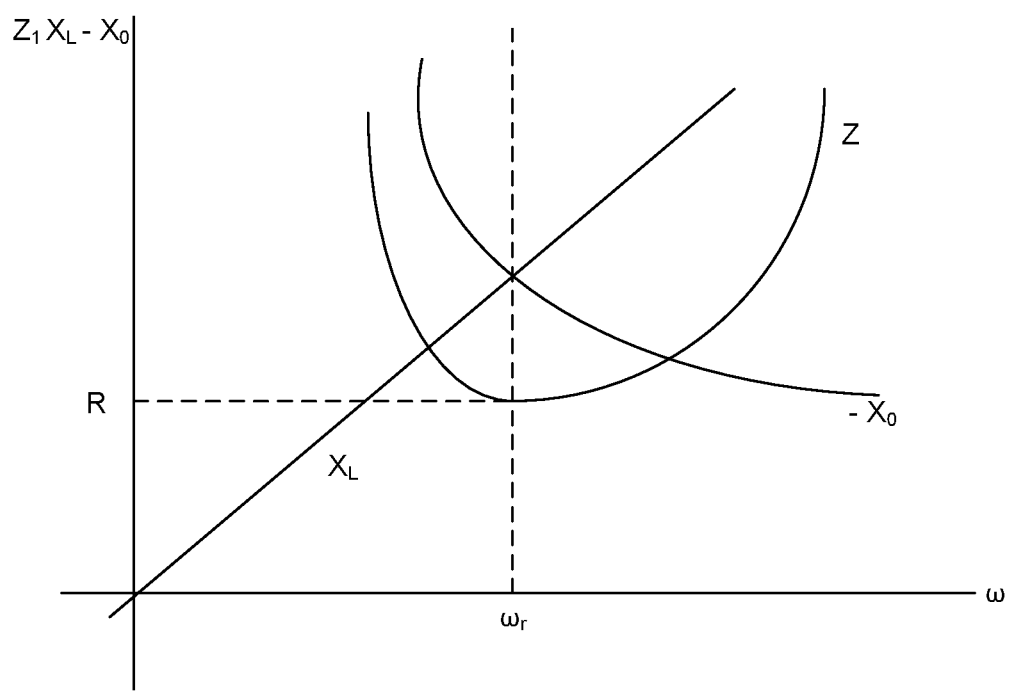
FIG. 28 is a graph depicting characteristics of a series resonator circuit for a resonant coupling circuit according to one aspect.

Any suitable resonator circuit can be used to implement a resonant coupling circuit. For example, FIG. 27 is a schematic diagram depicting an example of a series resonator circuit for implementing a resonant coupling circuit 1507. The series resonator circuit can include a resistor 2002 in series with an inductor 2004 and a capacitor 206. The characteristics of the series resonator circuit allow for suppressing signals outside of the RFID tag 1506 operating frequency. For example, FIG. 28 is a graph depicting the impedance of the series resonator circuit for implementing a resonant coupling circuit 1507. As depicted in FIG. 28, the series resonator circuit can provide high impedance values outside of the resonance frequency ωr.

In additional or alternative aspects, a multiple pole filter can be used for the coupling circuit 1507. Using a multiple pole filter can increase the suppression of the signals of the wireless standard that are transported via the coaxial cable.

General Considerations

The present invention has been described with reference to the accompanying drawings, in which certain aspects of the invention are shown. This invention may, however, be embodied in many different forms and should not be construed as limited to the aspects that are pictured and described herein; rather, these aspects are provided so that this disclosure will be thorough and complete, and will fully convey the scope of the invention to those skilled in the art.

Herein, references are made to the "positive" component and the "negative" component of the RFID control signal. Note that since the RFID may be an alternating current signal, in some cases the signal on each pair may oscillate between being a positive signal and a negative signal. Consequently, it will be appreciated that references herein to a "positive component" or a "negative component" of an RFID control signal are used to refer to the components of the RFID control signal at a given point in time in order to conveniently be able to distinguish between the two components of the signal.

Unless otherwise defined, all technical and scientific terms that are used in this disclosure have the same meaning as commonly understood by one of ordinary skill in the art to which this invention belongs. The terminology used in the above description is for describing particular aspects only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Certain aspects of the present invention have been described above with reference to flowchart illustrations. It will be understood that some blocks of the flowchart illustrations may be combined or split into multiple blocks, and that the blocks in the flow chart diagrams need not necessarily be performed in the order illustrated in the flow charts.

In the drawings and specification, there have been disclosed typical aspects of the invention and, although specific terms are employed, they are used in a generic and descriptive sense only and not for purposes of limitation, the scope of the invention being set forth in the following claims.

What is claimed is:

1. A system comprising:
a coupling circuit between a communications network and a radio frequency identification (RFID) tag associated with a passive element of a distributed antenna system; and
an attenuation circuit between the coupling circuit and the RFID tag, wherein the attenuation circuit is configured for coupling the RFID tag to ground;
wherein the coupling circuit comprises a physical coupling between the RFID tag and the communications network, the physical coupling having a resonant frequency that allows an RFID signal received from the RFID transmitter over the communications network to be transported to the RFID tag and impedes one or more non-RFID communication signals from the communications network from being transported to the RFID tag, wherein the RFID signal and the one or more non-RFID communication signals are carried on the communications network over at least one shared conductor.

2. The system of claim 1, further comprising:
the RFID transmitter in a fixed location in the distributed antenna system, wherein the fixed location is remote to the passive element, and
wherein the passive element is a non-powered element.

3. The system of claim 1, wherein the communications network comprises a coaxial cable.

4. The system of claim 1, wherein the physical coupling comprises at least one of a directional coupler or a non-directional coupler.

5. The system of claim 1, wherein the coupling circuit further comprises an air coupling between the RFID tag and the communications network.

6. The system of claim 5, wherein the air coupling comprises an RFID antenna communicatively coupled to the RFID tag and configured to receive the RFID signal from an antenna of the distributed antenna system.

7. The system of claim 5, wherein the coupling circuit further comprises a power divider between the RFID tag and each of the physical coupling and the air coupling.

8. The system of claim 1, wherein the coupling circuit comprises a signal path from a point on the communications network to the RFID tag, the signal path having a resistor connected in series with an inductor and a capacitor.

9. A distributed antenna system comprising:
a communications network;
a radio frequency identification (RFID) transmitter positioned in a remote antenna;
an RFID tag associated with a passive element remote from a position of the RFID transmitter over the communications network;

a coupling circuit providing a physical coupling between the RFID tag and the communications network, wherein RFID signals received from the RFID transmitter and non-RFID signals are carried on the communications network over at least one same conductor;

wherein the coupling circuit has a resonant frequency that allows the RFID signals received from the RFID transmitter over the communications network through the coupling circuit and inhibits the non-RFID signals from being transported to the RFID tag through the coupling circuit; and an attenuation circuit between the coupling circuit and the RFID tag, wherein the RFID tag is configured to be coupled to ground via the attenuation circuit.

10. The distributed antenna system of claim 9, wherein the communications network comprises a coaxial cable.

11. The distributed antenna system of claim 9, further comprising:
an air coupling between the RFID tag and communications network, wherein the air coupling is configured for coupling a first RFID signal to the RFID tag via a first signal path and the coupling circuit is configured for coupling a second RFID signal to the RFID tag via a second signal path that is different from the first signal path; and
a power divider between the RFID tag and each of the first signal path and the second signal path, wherein the power divider is configured for communicating at least one of the first RFID signal and the second RFID signal to the RFID tag.

12. The distributed antenna system of claim 11, wherein the air coupling comprises an RFID antenna communicatively coupled to the RFID tag and configured to receive an RFID signal from an antenna of the distributed antenna system, the RFID signal transmitted by the RFID transmitter.

13. A method comprising:
providing a coupling circuit between a communications network and a radio frequency identification (RFID) tag associated with a passive element of a distributed antenna system; and
transmitting an RFID signal received from an RFID transmitter to the RFID tag via the communications network and coupling circuit, wherein the RFID tag is coupled to ground via an attenuation circuit between the RFID tag and the coupling circuit, wherein the RFID signal and mobile communication signals are carried on the communications network over at least one same conductor;
wherein the coupling circuit inhibits the mobile communication signals on the communications network from being communicated to the RFID tag;
wherein providing the coupling circuit comprises providing a coupling circuit configured with a resonant frequency for allowing the RFID signal received from the RFID transmitter over the communications network to be transported to the RFID tag and for inhibiting the mobile communications signals on the communications network from being transported to the RFID tag.

14. The method of claim 13, further comprising:
providing the RFID transmitter in a fixed location in the distributed antenna system, wherein the fixed location is remote to the passive element.

15. The method of claim 13, wherein the communications network comprises a coaxial cable.

16. The method claim 13, wherein the coupling circuit further comprises an air coupling between the RFID tag and the communications network.

17. The method of claim 16,
wherein providing the coupling circuit that includes the air coupling comprises providing an RFID antenna communicatively coupled to the RFID tag; and
further comprising receiving an additional RFID signal from an antenna of the distributed antenna system via the air coupling.

* * * * *